(12) United States Patent
Skweres

(10) Patent No.: US 11,198,422 B2
(45) Date of Patent: Dec. 14, 2021

(54) ADAPTER ASSEMBLY FOR BRAKING SYSTEM

(71) Applicant: Westinghouse Air Brake Technologies Corporation, Wilmerding, PA (US)

(72) Inventor: Jeffrey B. Skweres, McKeesport, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 86 days.

(21) Appl. No.: 16/722,063

(22) Filed: Dec. 20, 2019

(65) Prior Publication Data

US 2020/0207323 A1 Jul. 2, 2020

Related U.S. Application Data

(60) Provisional application No. 62/785,908, filed on Dec. 28, 2018.

(51) Int. Cl.
*B60T 15/02* (2006.01)
*B60T 8/17* (2006.01)
(Continued)

(52) U.S. Cl.
CPC .......... *B60T 15/024* (2013.01); *B60T 8/1705* (2013.01); *B60T 13/406* (2013.01); *F16K 27/003* (2013.01)

(58) Field of Classification Search
CPC .... B60T 13/406; B60T 13/665; B60T 15/024; B60T 15/027; B60T 15/185; B60T 17/04; B60T 17/043
See application file for complete search history.

(56) References Cited

U.S. PATENT DOCUMENTS 2,810,610 A * 10/1957 Browne ................ B60T 13/665
303/15
6,142,442 A 11/2000 Carroll
(Continued)

FOREIGN PATENT DOCUMENTS

AU 199873974 A1 9/1999
AU 200234300 B2 11/2002
(Continued)

OTHER PUBLICATIONS

Examination Report No. 1 dated Feb. 11, 2021 for corresponding Australian application No. 2019284057 (7 pages).

*Primary Examiner* — Thomas J Williams
(74) *Attorney, Agent, or Firm* — The Small Patent Law Group LLC; Joseph M. Butscher

(57) ABSTRACT

An adapter assembly for an electronically controlled pneumatic (ECP) manifold system includes a housing having a mounting face that includes a plurality of ports. The housing also has a brake cylinder passageway, a reservoir passageway, and a brake cylinder exhaust passageway that are in fluid communication with the ports. The adapter assembly also includes an adapter valve configured to be in fluid communication with the brake cylinder passageway, the reservoir passageway, and the brake cylinder exhaust passageway. The adapter valve has a first position where the brake cylinder passageway and the reservoir passageway are in fluid communication while the brake cylinder passageway is isolated from the brake cylinder exhaust passageway. The adapter valve also has a second position where the brake cylinder passageway is isolated from the reservoir passageway while the brake cylinder passageway is in fluid communication with the brake cylinder exhaust passageway.

20 Claims, 13 Drawing Sheets

(51) Int. Cl.
  *B60T 13/40* (2006.01)
  *F16K 27/00* (2006.01)

(56) References Cited

U.S. PATENT DOCUMENTS

| | | |
|---|---|---|
| 6,676,229 B1 | 1/2004 | Marra et al. |
| 11,014,585 B2 * | 5/2021 | Skweres ............... B60T 15/027 |
| 2014/0049037 A1 | 2/2014 | White et al. |
| 2017/0253226 A1 * | 9/2017 | Gaughan ............... B60T 15/302 |

FOREIGN PATENT DOCUMENTS

| | | |
|---|---|---|
| AU | 200234352 A1 | 11/2002 |
| EP | 0729872 B1 | 3/2002 |
| WO | 2006124083 A2 | 11/2006 |
| WO | 2016012066 A1 | 1/2016 |

* cited by examiner

ADAPTER ASSEMBLY FOR BRAKING SYSTEM

CROSS-REFERENCE TO RELATED APPLICATION

The present application claims priority to and the benefit of U.S. Provisional Application No. 62/785,908 filed 28 Dec. 2018, which is incorporated herein by reference in its entirety.

BACKGROUND

Technical Field

The subject matter herein relates to an adapter assembly for a braking system of a vehicle system.

Discussion of Art

Brake equipment and braking systems for certain vehicle systems may be electronically controlled. For example, Railways of Australia has a standardized pneumatic air brake valve control system, referred to as a W-type triple valve system, which is similar in overall operation to American Association of Railroads (AAR) pneumatic air brake valves (such as the WABCO ABDX control valve). The W-type, freight pneumatic braking system is a relayed brake system, which utilizes a separate supply reservoir to fill brake cylinder during a brake application.

Brake equipment may include Electronically Controlled Pneumatic (ECP) systems to allow for the electronic control of the brakes rather than pneumatic control. ECP braking systems offer many advantages over pneumatic-only control, including superior braking and safety capabilities. ECP brake equipment on each rail vehicle may include a stand-alone All Electric Manifold (AEM), which contains the pressure transducers, various pneumatic and electro-pneumatic valves, etc. This equipment is used to monitor the pressures in the brake pipe, the brake cylinder(s), and specific reservoirs, and to convert the electrical brake commands into a form usable by a microprocessor. Operating according to its programming code and to the dictation of the brake commands and other electrical signals it has received, the microprocessor controls the electro-pneumatic valves.

AEM units having ECP functionality may be interfaced with existing triple valve equipment, such as the W-type triple valves commonly utilized in Australia, by utilizing a transition plate to provide air-connection between an existing W-type triple valve equipped railcar and an ECP stand-alone AEM. The transition plate enables full ECP S-4200 functionality for the existing triple valve system.

It can be costly to transition from an older legacy braking system to a newer braking system. This is especially true for vehicle systems that include several interconnected vehicles, because each vehicle may need to be updated before the new braking system is functional. For example, each rail vehicle requires the AEM described above before the ECP braking system can be realized. However, AEMs and similar brake equipment can be expensive.

BRIEF DESCRIPTION OF EMBODIMENTS

In one embodiment, an adapter assembly for an electronically controlled pneumatic (ECP) manifold system is provided. The adapter assembly includes a housing having a mounting face that includes a plurality of ports. The housing also has a brake cylinder passageway, a reservoir passageway, and a brake cylinder exhaust passageway that are in fluid communication with the ports. The adapter assembly also includes an adapter valve configured to be in fluid communication with the brake cylinder passageway, the reservoir passageway, and the brake cylinder exhaust passageway. The adapter valve has a first position where the brake cylinder passageway and the reservoir passageway are in fluid communication while the brake cylinder passageway is isolated from the brake cylinder exhaust passageway. The adapter valve also has a second position where the brake cylinder passageway is isolated from the reservoir passageway while the brake cylinder passageway is in fluid communication with the brake cylinder exhaust passageway.

In one embodiment, an assembly is provided that includes a manifold assembly having an electric manifold assembly. The electric manifold assembly includes a mode where the electric manifold assembly is controlled electrically. The assembly also includes an adapter assembly that has a housing having a mounting face coupled to the manifold assembly. The mounting face includes a plurality of ports. The housing includes a brake cylinder passageway, a reservoir passageway, and a brake cylinder exhaust passageway that are in fluid communication with the ports. The adapter assembly also includes an adapter valve configured to be in fluid communication with the brake cylinder passageway, the reservoir passageway, and the brake cylinder exhaust passageway. The adapter valve has a first position where the brake cylinder passageway and the reservoir passageway are in fluid communication while the brake cylinder passageway is isolated from the brake cylinder exhaust passageway. The adapter valve also has a second position where the brake cylinder passageway is isolated from the reservoir passageway while the brake cylinder passageway is in fluid communication with the brake cylinder exhaust passageway.

In one embodiment, an ECP overlay and adapter assembly for a W-type triple valve system is provided. The assembly includes an ECP overlay manifold assembly that includes a manifold body comprising a pipe bracket face configured to engage a face of a pipe bracket of a railway brake system. The assembly also includes valve face configured to engage a face of a W-type triple valve of a railway brake system. The assembly also includes an electric manifold face. The ECP overlay and adapter assembly also includes an electric manifold assembly engaged with the electric manifold face of the manifold body. The electric manifold assembly having an ECP mode where the electric manifold assembly is configured to allow electronic control of a brake cylinder of a railway brake system. The ECP overlay and adapter assembly also includes an ECP adapter assembly that includes a housing having a mounting face engaged with the valve face of the manifold body. The mounting face defines an auxiliary reservoir port, an accelerated release reservoir port, a brake cylinder port, a brake pipe port, and a brake cylinder exhaust port. The housing defines a brake cylinder passageway in fluid communication with the brake cylinder port, a brake pipe passageway in fluid communication with the brake pipe port, a combined reservoir passageway in fluid communication with the auxiliary reservoir port and the accelerated release reservoir port, and a brake cylinder exhaust passageway in fluid communication with the brake cylinder exhaust port. The ECP overlay and adapter assembly also includes a charging valve in fluid communication with the brake pipe passageway and the combined reservoir passageway. The charging valve is configured to prevent a backflow of air from the combined reservoir passageway to the brake pipe passageway. The ECP overlay and adapter assembly also includes an adapter valve in fluid communication with the brake pipe passageway, the brake cylinder passageway, the combined reservoir passageway, and the brake cylinder exhaust passageway. The adapter valve has a first position where the brake cylinder passageway and the combined reservoir passageway are in fluid communication while the brake cylinder passageway is isolated from the brake cylinder exhaust passageway. The adapter valve has a second position where the brake cylinder passageway is isolated from the combined reservoir passageway while the brake cylinder passageway is in fluid communication with the brake cylinder exhaust passageway.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to an adapter assembly of a braking system (or sub-system) of a vehicle system. In some embodiments, the adapter assembly may be used to construct a braking system that is then installed onto a vehicle system. In other embodiments, the adapter assembly may be retrofitted with a legacy braking system that may or may not be presently connected to a vehicle system. The adapter assembly may replace one or more components of the legacy braking system. For example, embodiments may replace a triple valve coupled to a manifold. Optionally, the adapter assembly may enable one or more new functionalities. For vehicle systems having multiple interconnected rail vehicles, an owner of a vehicle system may replace the triple valve of each braking system over time until an electronically controlled pneumatic system can be fully realized.

In some embodiments, the braking system is used by a railway vehicle, such as a locomotive or rail car. The railway vehicle may be interconnected to multiple other railway vehicles. Other embodiments may be suitable for other types of vehicle systems, including automobiles, trucks, marine vessels, off-highway vehicle systems, and agricultural vehicle systems. Particular embodiments provide an ECP overlay system, such as those that may be used with a W-type triple valve.

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
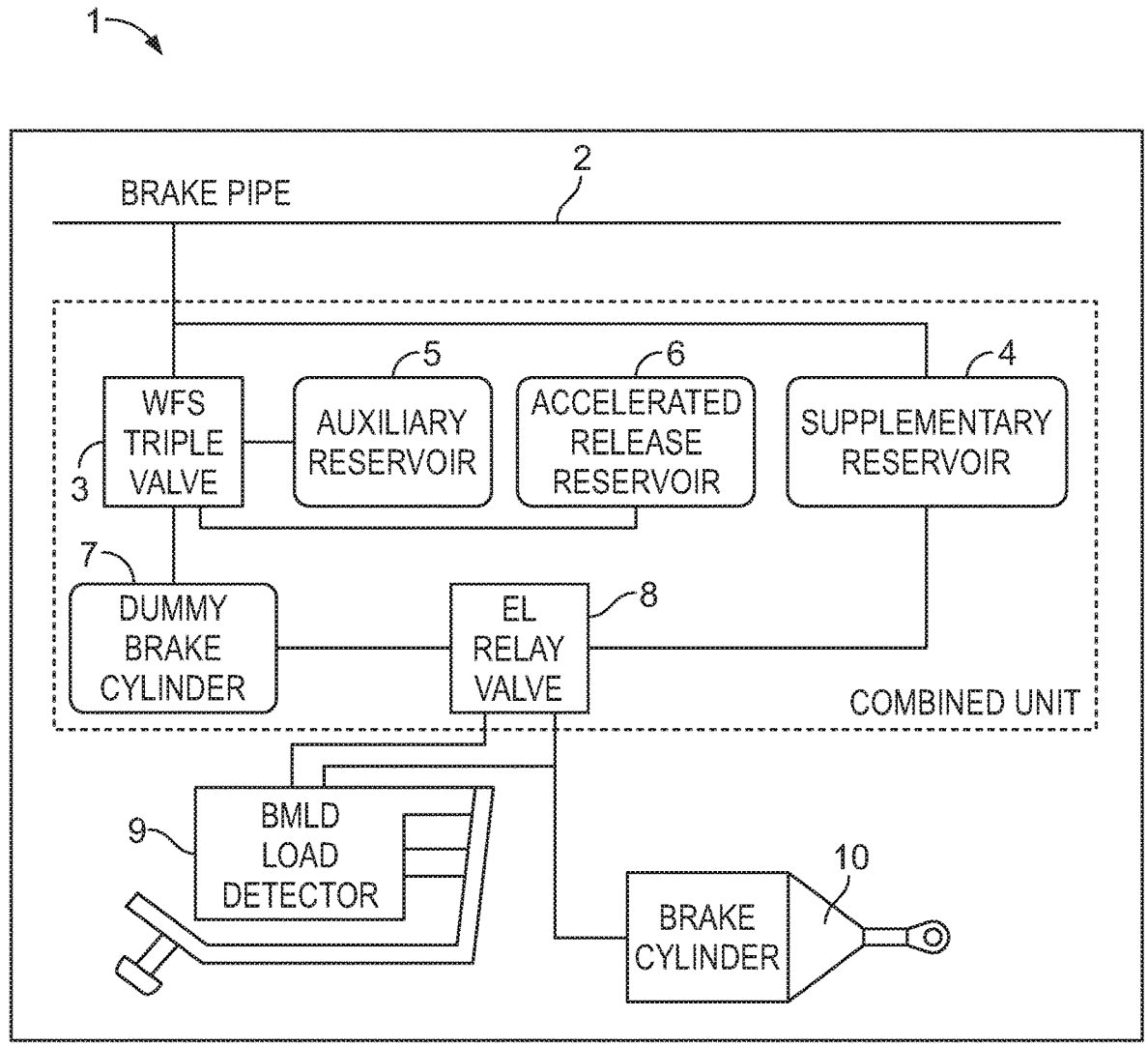
FIG. 1 is a schematic view of a conventional W-type relayed freight braking system.
Figure 2:
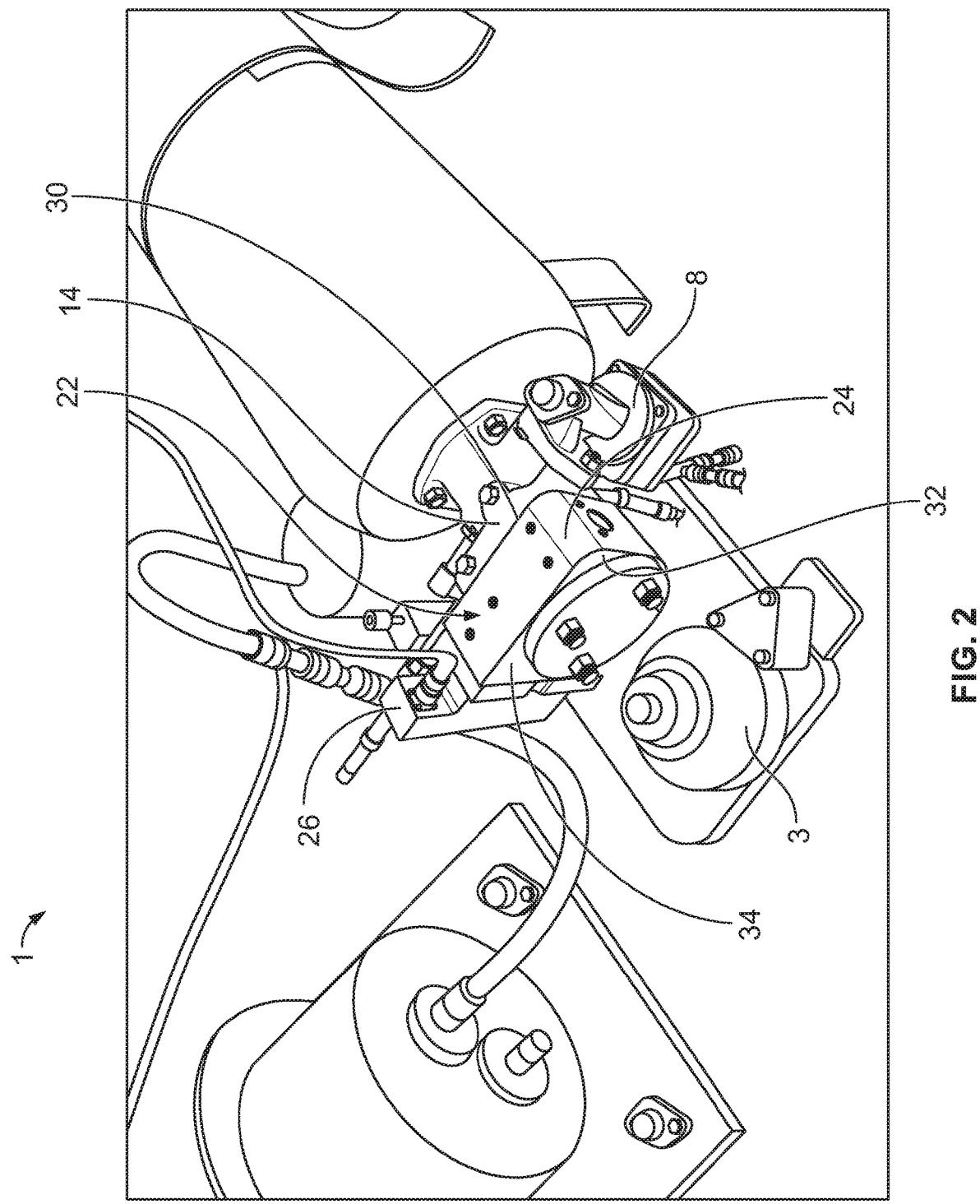
FIG. 2 is a perspective view of a W-type relayed freight braking system with an ECP overlay manifold.

Referring to FIGS. 1 and 2, a conventional W-type triple valve relayed brake system 1 includes a brake pipe 2 in fluid communication with a triple valve 3 and supplementary reservoir 4. The triple valve 3 is in fluid communication with an auxiliary reservoir 5, an accelerated release reservoir 6, and a dummy brake cylinder 7. The triple valve 3 is a WF5 triple valve, although other W-type triple valves operate in a similar manner. A relay valve 8, more specifically an E/L relay valve, is in fluid communication with the dummy brake cylinder 7, the supplementary reservoir 4, a load detector valve 9, and a brake cylinder 10. The triple valve 3 supplies air pressure to the dummy brake cylinder 7 based on the command signal from the brake pipe 2 (brake pipe pressure reduction) with the relay valve 8 sensing the pressure in the dummy brake cylinder 7 and supplying supplementary reservoir air directly into the brake cylinder 10. The load detector valve 9 detects the load (e.g., overall weight) of the freight car and modulates the air pressure supplied to the brake cylinder 10 based on the load, such as one pressure for empty cars and another, higher pressure for fully-loaded cars.

Referring to FIG. 2, ECP functionality can be provided on conventional triple valve relayed brake systems by utilizing an ECP overlay manifold system positioned between the triple valve 3 and a pipe bracket 14. The ECP overlay manifold system may be the ECP overlay manifold shown and described in U.S. Provisional Patent Application No. 62/587,106 filed on Nov. 16, 2017, which is hereby incorporated by reference in its entirety. The ECP overlay manifold system 22 allows for either pneumatic control or electronic control of the brake system.

Referring to FIGS. 2-9, an assembly 20 is shown. The assembly may be or include an ECP overlay and adapter assembly for a W-type triple valve system. More specifically, the ECP overlay and adapter assembly 20 is configured to replace the WF5 triple valve 3 to provide all electric ECP function, although the assembly 20 may also be utilized in connection with various W-type triple valve systems. The assembly 20 includes an ECP overlay manifold system 22 having a manifold body 24 (shown in FIG. 2) and an electric manifold assembly 26, and an adapter assembly 28 as discussed in more detail below.

Referring to FIGS. 2-7, the manifold body 24 is configured to be positioned between the pipe bracket 14 and the W-type triple valve 3 shown in FIG. 2. According to one embodiment, however, the triple valve 3 is removed and replaced with the Adapter assembly 28 to allow the electric manifold assembly 26 to emulate AEM function. The manifold body 24 includes a pipe bracket face 30 configured to engage a face of the pipe bracket 14 of the W-type triple valve brake system 1, a valve face 32 configured to engage a face of the W-type triple valve 3 of the W-type triple valve brake system 1, and an electric manifold mounting face 34 configured to engage the electric manifold assembly 26. The pipe bracket face 30 defines an auxiliary reservoir pressure port 36, an accelerated release reservoir pressure port 38, a brake pipe pressure port 40, a brake cylinder pressure port 42, and a brake cylinder exhaust port 44. The valve face 32 also defines an auxiliary reservoir pressure port 46, an accelerated release reservoir pressure port 48, a brake pipe pressure port 50, a brake cylinder pressure port 52, and a brake cylinder exhaust pressure port 54.

Referring to FIGS. 4-7, the auxiliary reservoir pressure ports 36, 46 of the pipe bracket face 30 and the valve face 32 are in fluid communication via an auxiliary reservoir pressure passage 56. The accelerated release reservoir pressure ports 38, 48 of the pipe bracket face 30 and the valve face 32 are in fluid communication via an accelerated release reservoir pressure passage 58. The brake pipe pressure ports 40, 50 of the pipe bracket face 30 and the valve face 32 are in fluid communication via a brake pipe pressure passage 60. The brake cylinder pressure ports 42, 52 of the pipe bracket face 30 and the valve face 32 are in fluid communication via a brake cylinder pressure passage 62. The brake cylinder exhaust ports 44, 54 of the pipe bracket face 30 and the valve face 32 are in fluid communication via a brake cylinder exhaust passage 64.

Figure 3:
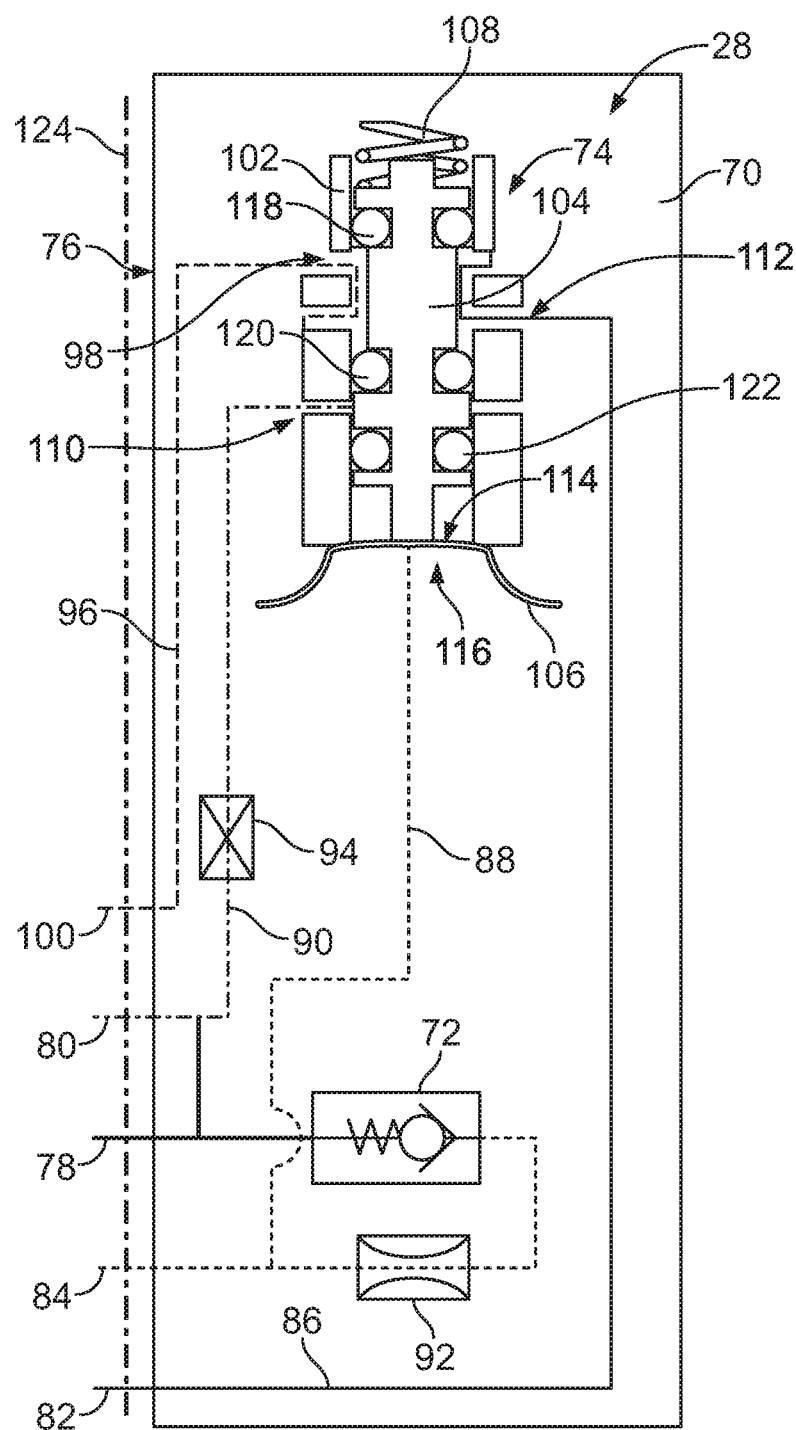
FIG. 3 is a schematic view of an adapter assembly according to one embodiment.
Figure 4:
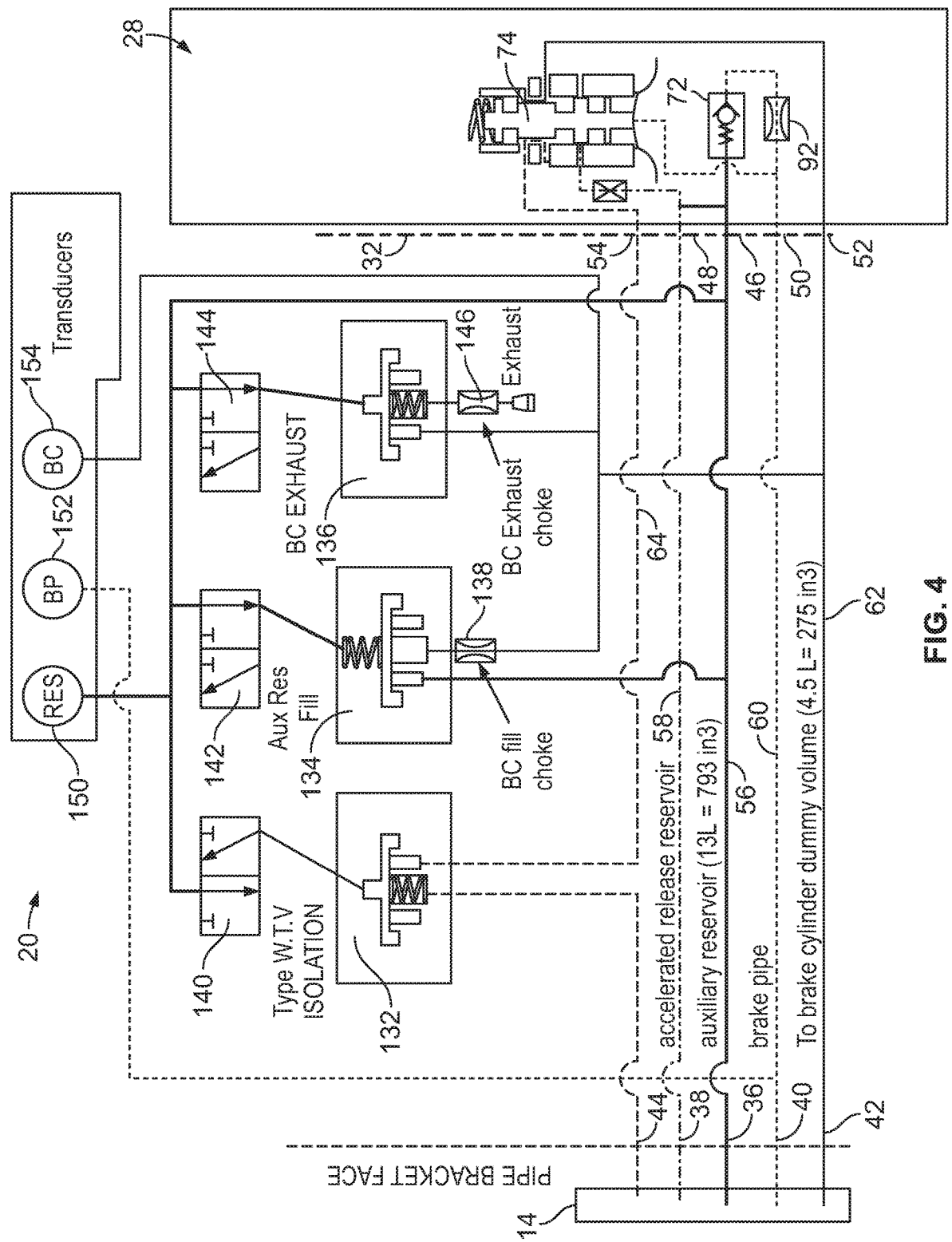
FIG. 4 is a schematic view of an ECP overlay system and adapter assembly according to one embodiment, showing the system in an ECP cut-in position and full release position.

Referring to FIG. 3, the Adapter assembly 28 includes a housing 70, a charging valve 72, and an adapter valve 74. The housing 70 has a mounting face 76 that defines an auxiliary reservoir port 78, an accelerated release reservoir port 80, a brake cylinder port 82, a brake pipe port 84, and a brake cylinder exhaust port 100, with the housing 70 defining a brake cylinder passageway 86 in fluid communication with the brake cylinder port 82, a brake pipe passageway 88 in fluid communication with the brake pipe port 84, a combined reservoir passageway 90 in fluid communication with the auxiliary reservoir port 78 and the accelerated release reservoir port 80, and a brake cylinder exhaust passageway 96 in fluid communication with the brake cylinder exhaust port 100. The charging valve 72 is in fluid communication with the brake pipe passageway 88 and the combined reservoir passageway 90. The charging valve 72 is configured to prevent flow (e.g., backflow) of air from the combined reservoir passageway 90 to the brake pipe passageway 88 when the brake pipe pressure is less than the combined reservoir pressure. The adapter valve 74 is in fluid communication with the brake pipe passageway 88, the brake cylinder passageway 86, the combined reservoir passageway 90, and the brake cylinder exhaust passageway 96, with the adapter valve 74 having a first position (down) where the brake cylinder passageway 86 and the combined reservoir passageway 90 are in fluid communication and where the brake cylinder passageway 86 and the brake cylinder exhaust passageway 96 are isolated from each other, and a second position (up) where the brake cylinder passageway 86 is isolated from the combined reservoir passageway 90 and the brake cylinder passageway 86 and the brake cylinder exhaust passageway 96 are in fluid communication.

Referring again to FIG. 3, the charging valve 72 is a one-way check valve, although other suitable arrangements may be utilized. The Adapter assembly 28 also includes a charging choke 92 in fluid communication with the brake pipe passageway 88 and positioned between the brake pipe port 84 and the charging valve 72, and a combined reservoir choke 94 located in the combined reservoir passageway 90 configured to control the rate of brake cylinder pressure development during a pneumatic emergency application. The adapter valve 74 may be a spool valve, although other suitable valve arrangements may be utilized. In particular, the adapter valve 74 includes a bushing 102, a valve body 104, a diaphragm 106, and a spring 108, with the valve body 104 moveable relative to the bushing 102 between a first position corresponding to the first position of the adapter valve 74 and a second position corresponding to the second position of the adapter valve 74. The spring 108 biases the valve body 104 from the second position toward the first position. The bushing 102 defines a combined reservoir bushing port 110 in fluid communication with the combined reservoir passageway 90, a brake cylinder bushing port 112 in fluid communication with the brake cylinder passageway 86, and a brake cylinder exhaust bushing port 98 in fluid communication with the brake cylinder exhaust passageway 96. The diaphragm 106 has a first side 114 and a second side 116 positioned opposite the first side 114, with the second side 116 of the diaphragm 106 in fluid communication with the brake pipe passageway 88. As discussed in more detail below, air pressure from the brake pipe passageway 88 is configured to bias the valve body 104 from the first position (down) to the second position (up). The valve body 104 includes a first O-ring 118, a second O-ring 120, and a third O-ring 122, with the first O-ring 118 and the second O-ring 120 isolating the brake cylinder bushing port 112 and the brake cylinder exhaust bushing port 98 from the combined reservoir bushing port 110 when the valve body 104 is in the second position and the second O-ring 120 and the third O-ring 122 isolating the combined reservoir bushing port 110 from the brake cylinder bushing port 112 and the brake cylinder exhaust bushing port 98 when the valve body 104 is in the second position (up). A distance between the first O-ring 118 and second O-ring 120 is configured to allow fluid communication between the combined reservoir bushing port 110 and the brake cylinder bushing port 112 when the valve body 104 is in the first position (down). The first O-ring 118 also isolates the brake cylinder exhaust bushing port 98 from the brake cylinder bushing port 112 when the valve body 104 is in the first position (down).

Referring to FIGS. 3-7, the Adapter assembly 28 further includes a gasket 124 engaged by the overlay mounting face 76 of the housing 70 and the valve face 32 (FIG. 2) of the manifold body 24 (FIG. 2). The gasket 124 forms a seal between the overlay mounting face 76 of the housing 70 and the valve face 32 of the manifold body 24. The auxiliary reservoir pressure port 46 of the valve face 32 of the manifold body 24 is in fluid communication with the auxiliary reservoir port 78 of the housing 70 of the Adapter assembly 28. The accelerated release reservoir pressure port 48 of the valve face 32 of the manifold body 24 is in fluid communication with the accelerated release reservoir port 80 of the housing 70 of the Adapter assembly 28. The brake pipe pressure port 50 of the valve face 32 of the manifold body 24 is in fluid communication with the brake pipe port 84 of the housing 70 of the Adapter assembly 28. The brake cylinder pressure port 52 of the valve face 32 of the manifold body 24 is in fluid communication with the brake cylinder port 82 of the housing 70 of the Adapter assembly 28. The brake cylinder exhaust pressure port 54 of the valve face 32 of the manifold body 24 is in fluid communication with the brake cylinder exhaust port 100 of the housing 70.

Figure 5:
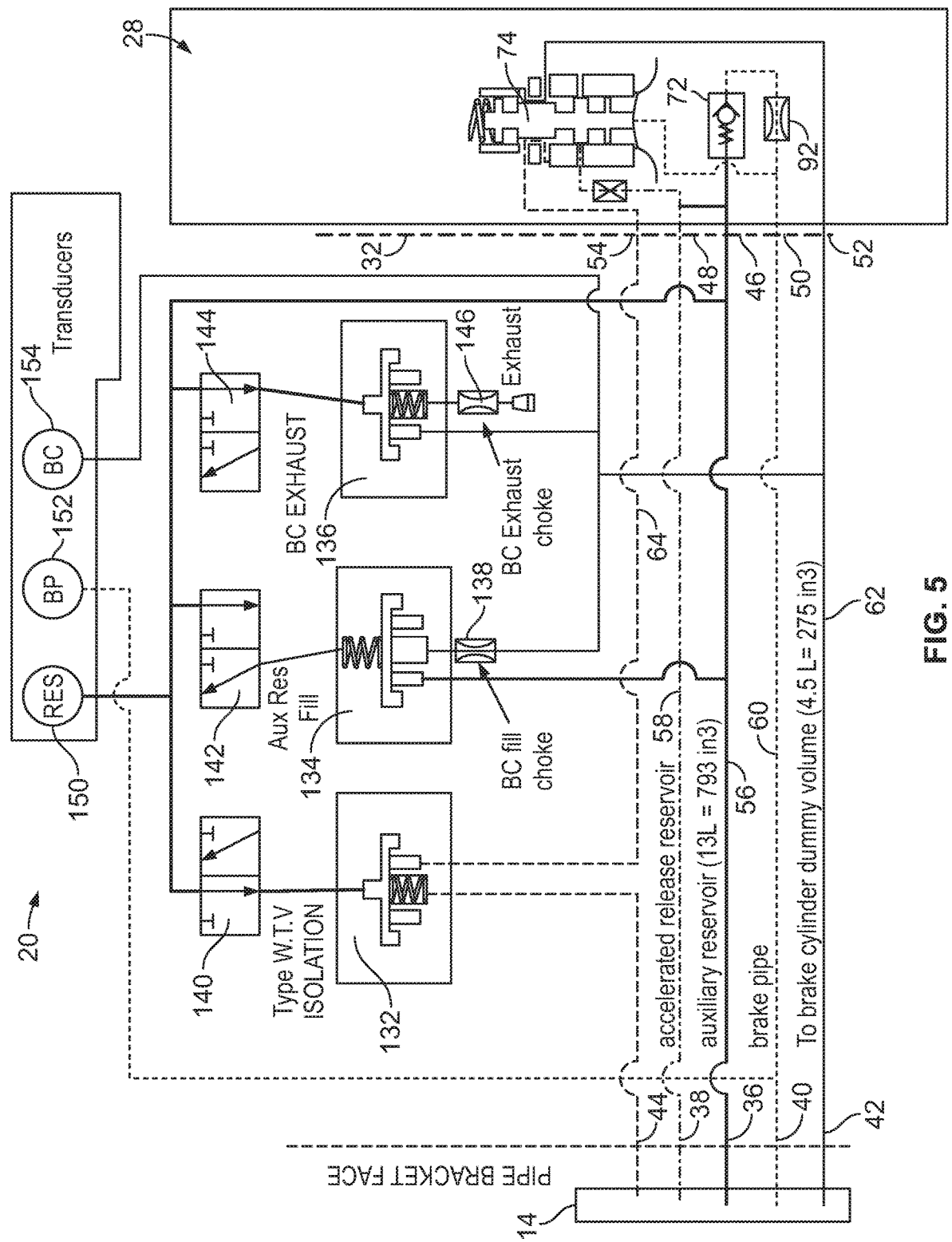
FIG. 5 is a schematic view of the ECP overlay system and adapter assembly of FIG. 4, showing the system in an ECP cut-in position and brake application position (brake pipe pressure still high)

Referring to FIGS. 4-7, the electric manifold assembly 26 (FIG. 2) includes an isolation valve 132, a fill valve 134, and a brake cylinder exhaust valve 136. The isolation valve 132, the fill valve 134, and the brake cylinder exhaust valve 136 each have an open position (diaphragm check valve unseated) and closed position (diaphragm check valve seated). When the electric manifold assembly 26 is in the ECP mode (cut-in) with the fill valve 134 in the open position, and the isolation valve 132 and the brake cylinder exhaust valve 136 are each in the closed position, as shown in FIG. 5, the fill valve 134 is configured to place the auxiliary reservoir passage 56 in fluid communication with the brake cylinder pressure passage 62. As discussed in more detail below, the electric manifold assembly 26 shown in FIG. 5 is in ECP mode (ECP cut-in) during a brake application. The fill valve 134 is configured to place the auxiliary reservoir passage 56 in fluid communication with the brake cylinder pressure passage 62 via a brake cylinder fill choke 138.

The isolation valve 132, the fill valve 134, and the brake cylinder exhaust valve 136 are electronically-controlled via an isolation solenoid 140, a fill solenoid 142, and a brake cylinder exhaust solenoid 144, respectively. The isolation valve 132, the fill valve 134, and the brake cylinder exhaust valve 136 are each diaphragm check valves, although other suitable valve arrangements may be utilized. The isolation valve 132 is biased to the open position, the fill valve 134 is biased to the closed position, and the brake cylinder exhaust valve 136 is biased to the open position. The isolation solenoid 140, the fill solenoid 142, and the brake cylinder exhaust solenoid 144 are each configured to supply pneumatic pressure to the respective isolation valve 132, the fill valve 134, and the brake cylinder exhaust valve 136 to maintain the isolation valve 132, the fill valve 134, and the brake cylinder exhaust valve 136 in the closed position. As shown in FIGS. 4-7, the pneumatic pressure may be pressure from the auxiliary reservoir passage 56 supplied via the solenoids 140, 142, 144 to the respective diaphragms of the valves 132, 134, 136. Opening and closing of the solenoids 140, 142, 144 controls whether the auxiliary reservoir passage 56 pressure acts on the top side of the diaphragms of the valves 132, 134, 136 thereby controlling whether the valves 132, 134, 136 are in the open or closed position.

The isolation valve 132 is in fluid communication with the brake cylinder exhaust passage 64 and is typically configured to place the W-type triple valve 3 (FIG. 2) in fluid communication with the brake cylinder exhaust passage 64 when the isolation valve 132 is in the open position.

The fill valve 134 is in fluid communication with the auxiliary reservoir passage 56 and the brake cylinder passage 62 with the auxiliary reservoir passage 56 being in fluid communication with the brake cylinder passage 62 when the fill valve 134 is in the open position (fill solenoid 142 is energized). The auxiliary reservoir passage 56 is isolated from the brake cylinder passage 62 when the fill valve 134 is in the closed position (fill solenoid 142 is de-energized). The brake cylinder exhaust valve 136 is in fluid communication with the brake cylinder passage 62 and atmospheric pressure via a brake cylinder exhaust choke 146. The brake cylinder pressure passage 62 is in fluid communication with atmospheric pressure with the brake cylinder exhaust valve 136 in the open position (exhaust solenoid 144 energized). The brake cylinder pressure passage 62 is isolated from atmospheric pressure when the brake cylinder exhaust valve 136 is in the closed position (exhaust solenoid 144 de-energized).

Referring again to FIGS. 4-7, the electric manifold assembly 26 (FIG. 2) further includes an auxiliary reservoir pressure transducer 150, a brake pipe pressure transducer 152, and a brake cylinder pressure transducer 154 to measure the respective pressures of the passages 56, 60, 62.

ECP Mode in Release Position

Referring to FIGS. 1-4, the electric manifold assembly 26 is in ECP mode (electronically cut-in) to provide electronic control of the brake system 1. The electric manifold assembly 26 is placed in ECP mode electronically. The isolation valve 132 is in the open position (isolation solenoid 140 de-energized). In a release position in ECP mode, the fill valve 134, and the brake cylinder exhaust valve 136 are in the closed position (fill solenoid 142 and brake cylinder exhaust solenoid 144 de-energized) and pressurized on their seats by the auxiliary reservoir passage 56 pressure via the solenoids 142, 144 thereby isolating the auxiliary reservoir passage 56 from the brake cylinder passage 62 as well as isolating the brake cylinder passage 62 from atmosphere via the brake cylinder exhaust valve 136.

During a brake system charge and/or recharge, the brake pipe pressure from the train line will flow directly into the Adapter assembly 28, through the charging choke 92, through the charging valve 72, to the combined reservoir passageway 90 in fluid communication with the auxiliary reservoir port 78 and the accelerated release reservoir port 80. Simultaneously, brake pipe pressure will flow to the second side 116 of the diaphragm 106 of the adapter valve 74 to keep the adapter valve 74 in the second position. Due to the combined reservoir passageway 90, the auxiliary reservoir 5 and accelerated release reservoir 6 will be recharged at the same time, which ensures that a sufficient amount of reservoir pressure in the system is being used to pilot the three solenoid valves 140, 142, 144 in the electronic manifold assembly 26.

ECP Mode in Application Position.

Referring to FIGS. 1, 2 and 5, the electric manifold assembly 26 is in ECP mode (electronically cut-in) to provide electronic control of the brake system 1. When in ECP mode, the assembly 26 electronically controls the auxiliary reservoir pressure passage 56. The brake pipe 2 of the train and the brake pipe passage 60 are maintained at the system supply charge pressure. The isolation valve 132 will move to the closed position (solenoid 140 energized). The fill valve 134 is moved to the open position by electronically energizing the fill solenoid 142 that isolates the flow of air from the auxiliary reservoir passage 56 to the top side of the diaphragm of the fill valve 134 and venting it to atmosphere thereby allowing the pressure from the auxiliary reservoir passage 56 to overcome the biasing force of the spring of the fill valve 134 to unseat the diaphragm. With the fill valve 134 in the open position, pressure from the auxiliary reservoir passage 56 is directed to the brake cylinder passage 62 via the brake cylinder fill choke 138 to initiate a brake application.

The brake cylinder passage 62 may be in fluid communication with the brake cylinder dummy volume 7 rather than a brake cylinder with the E/L relay valve 8 moving to an appropriate position based on the specific pressure in the dummy volume 7 to allow the supply reservoir 4 to directly feed the downstream brake cylinder 10. The brake cylinder exhaust valve 136 remains in the closed position (brake cylinder exhaust solenoid 144 remains de-energized) and pressurized on its seat by the auxiliary reservoir passage 56 pressure via the brake cylinder exhaust solenoid 144 thereby isolating the brake cylinder passage 62 from atmosphere via the brake cylinder exhaust valve 136. Once the target brake cylinder pressure is obtained, the fill solenoid 142 is de-energized, thus allowing the fill valve 134 to close on its seat to terminate the flow of auxiliary reservoir 56 into the brake cylinder passage 62.

ECP Mode in Releasing Position (Brake Pipe Pressure High).

Figure 6:
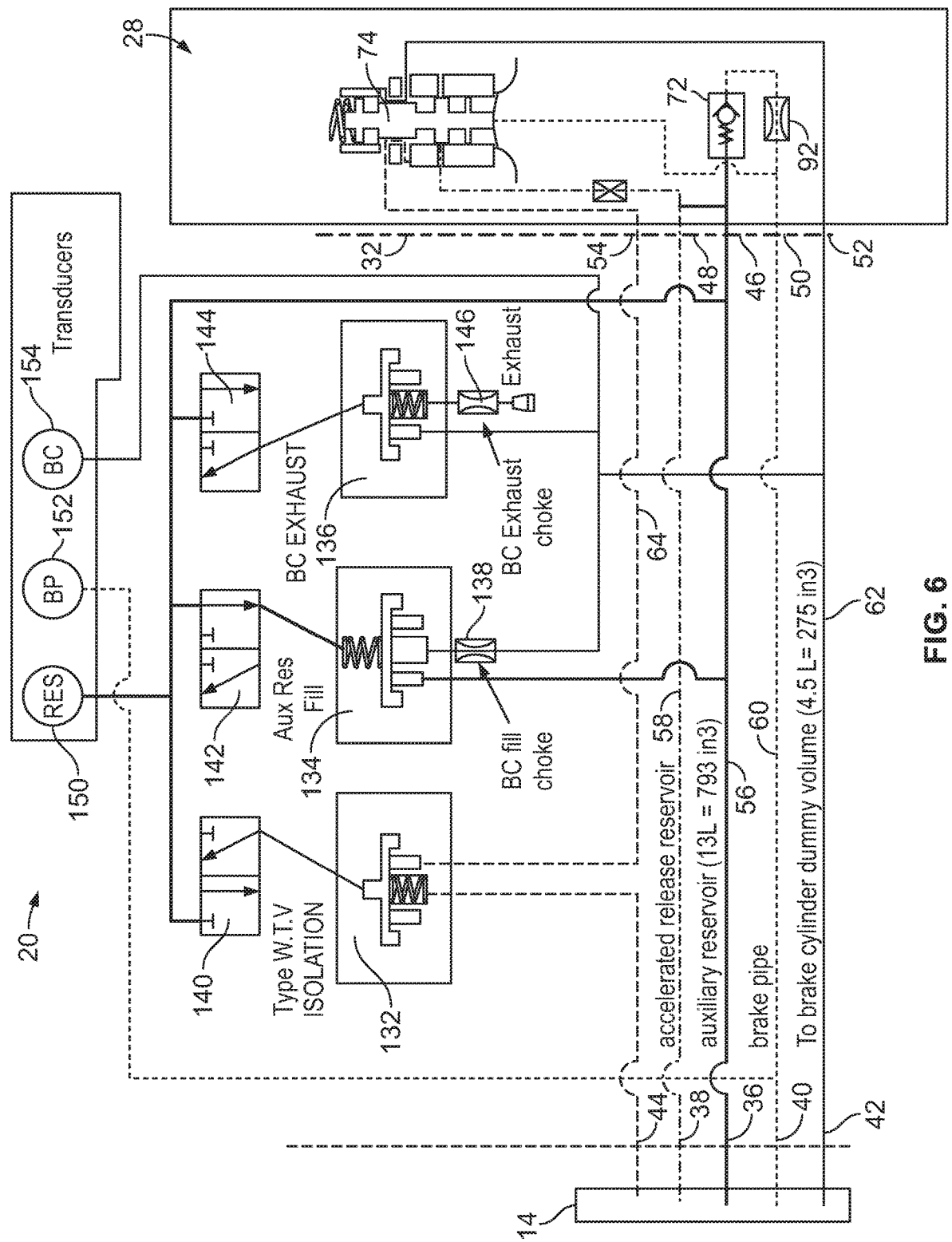
FIG. 6 is a schematic view of the ECP overlay system and adapter assembly of FIG. 4, showing the system in an ECP cut-in position and brake release position (brake pipe pressure still high)
Figure 7:
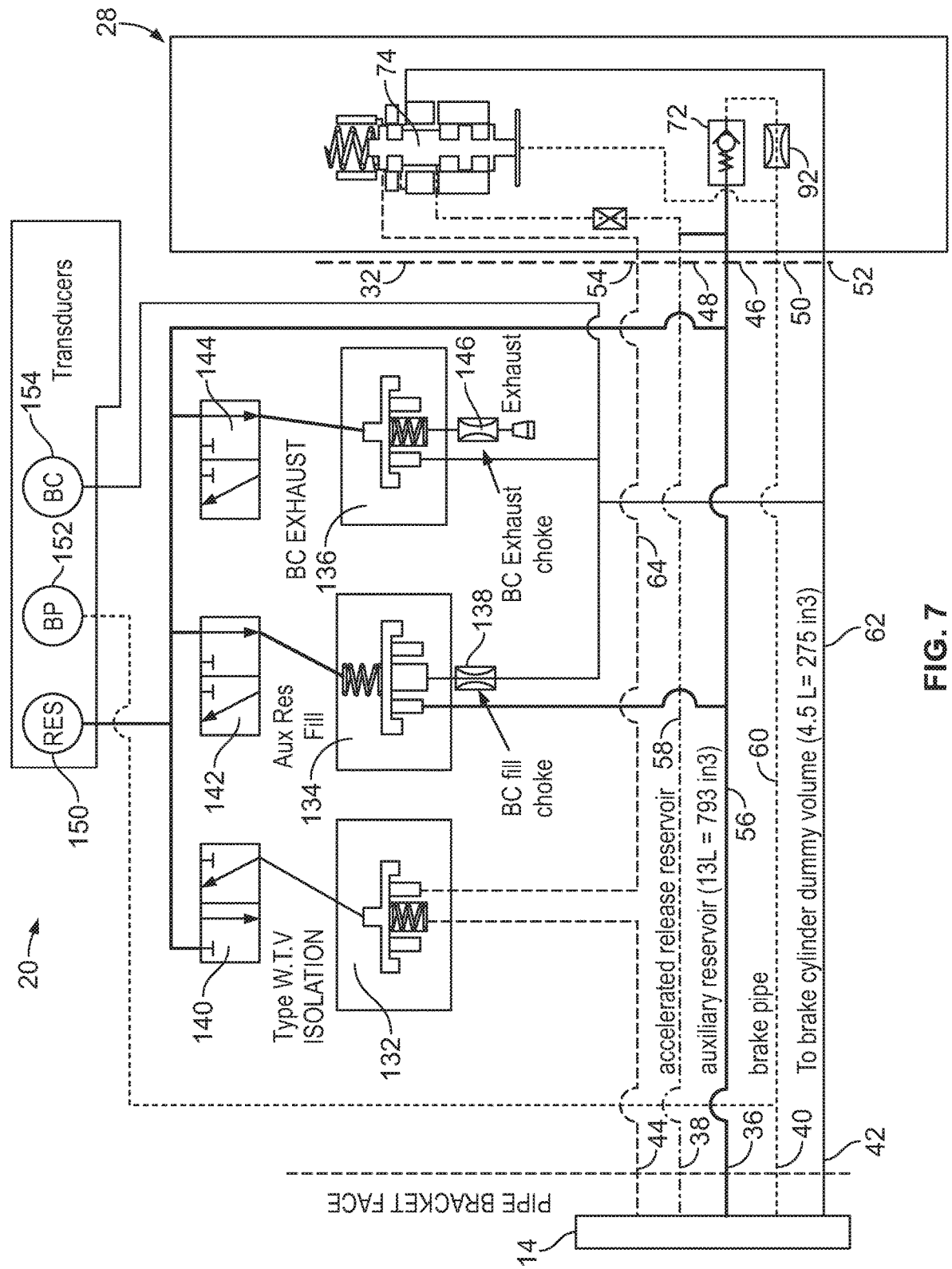
FIG. 7 is a schematic view of the ECP overlay system and adapter assembly of FIG. 4, showing the system in an ECP cut-in position and a pneumatic emergency being made.
Figure 8:
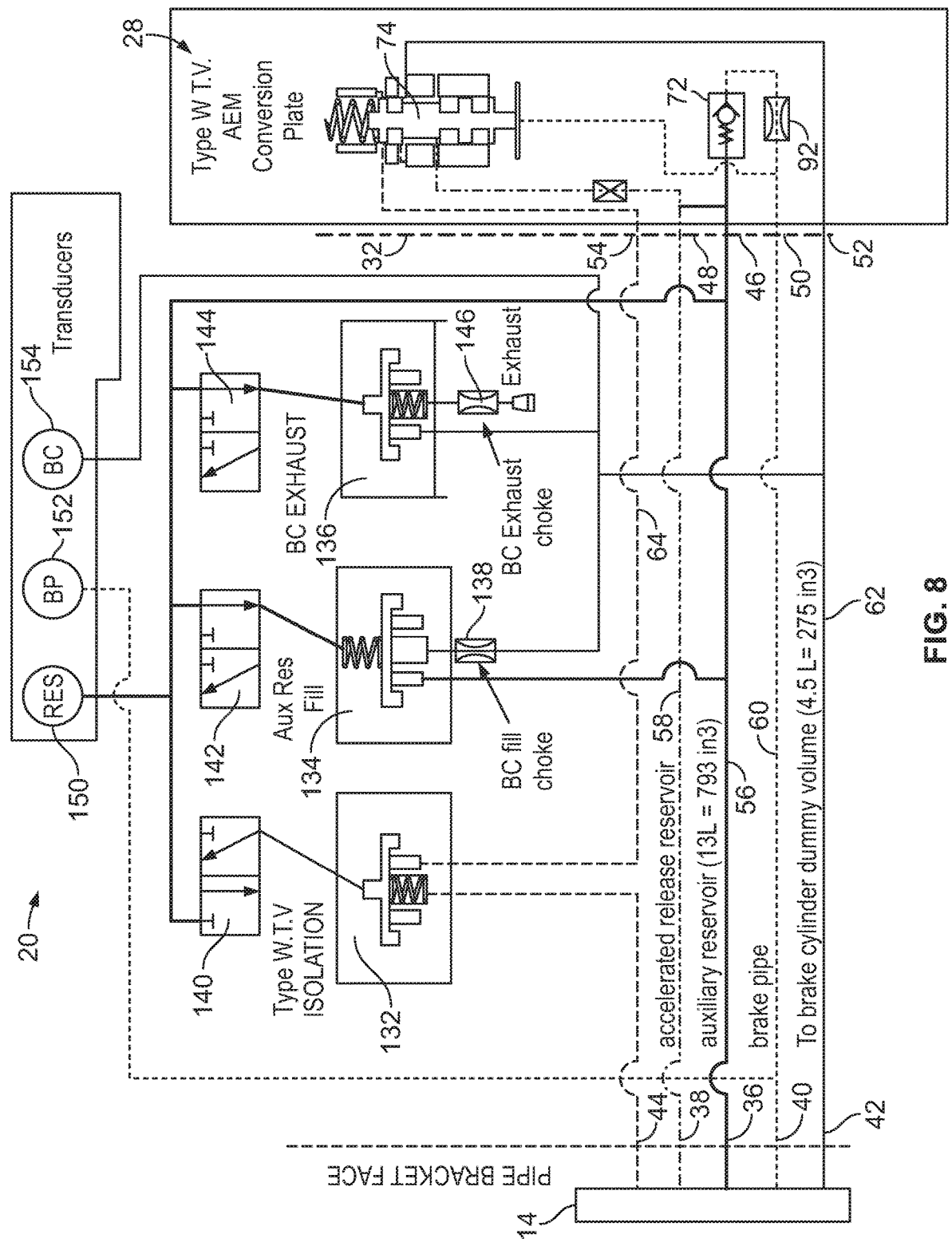
FIG. 8 is a schematic view of the ECP overlay system and adapter assembly of FIG. 4, showing the system in an ECP cut-out position and a pneumatic emergency being made.
Figure 9:
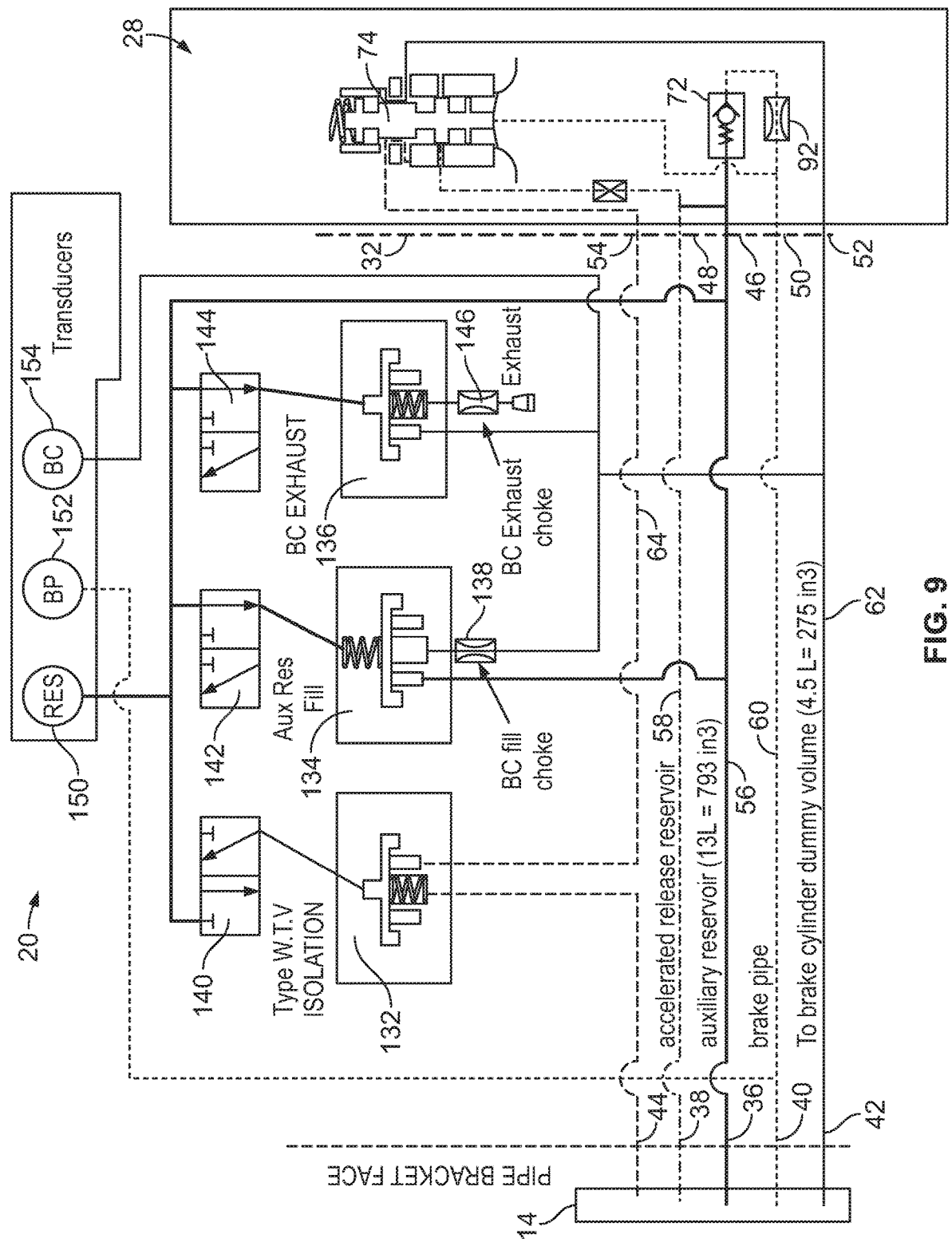
FIG. 9 is a schematic view of the ECP overlay system and adapter assembly of FIG. 4, showing the system in an ECP cut-in position while an unexpected power loss occurs with brake pipe pressure still high.

Referring to FIGS. 1, 2, and 6, the electric manifold assembly 26 is in ECP mode (electronically cut-in) to provide electronic control of the brake system 1. The brake pipe 2 of the train and the brake pipe passage 60 are maintained at the system supply charge pressure, such as 72.5 psi, although other suitable pressures may be utilized. While in ECP mode and when the signal to release brake cylinder pressure is obtained by the electric manifold assembly 26, the fill valve 134 is already in its closed position, where auxiliary reservoir passage 56 is isolated from the brake cylinder passage 62. The isolation valve 132 will remain in the open position (de-energized). The brake cylinder exhaust valve 136 is moved to the open position thereby allowing brake cylinder pressure to vent to atmosphere via the brake cylinder exhaust choke 146 to release the brake application.

The brake cylinder exhaust valve 136 is moved to the open position by electronically energizing the brake cylinder exhaust solenoid 144 to isolate and vent to atmosphere the pressure from the auxiliary reservoir passage 56 from the top of the diaphragm of the brake cylinder exhaust valve 136. When brake cylinder pressure reaches approximately 11 psi in brake cylinder pressure passage 62, the brake cylinder exhaust valve 136 is moved back to its closed position by de-energizing the brake cylinder exhaust solenoid 144 until brake cylinder pressure reaches approximately 5 psi in brake cylinder pressure passage 62. The brake cylinder exhaust valve 136 is then re-opened by energizing brake cylinder exhaust solenoid 144 once again until brake cylinder pressure reaches 0 psi in the brake cylinder pressure passage 62 with the brake cylinder exhaust valve 136 moving back to its closed position by de-energizing the brake cylinder exhaust solenoid 144. The adapter valve 74 will remain in the second position (up) due to the brake pipe pressure remaining fully charged or at a high pressure.

ECP Mode in Releasing Position (Brake Pipe Pressure Low/Pneumatic Emergency Made).

Referring to FIGS. 1-3 and 7, the electric manifold assembly 26 is in ECP mode (electronically cut-in) to provide electronic control of the brake system 1. When the electronic manifold assembly 26 is in the release position, the isolation valve 132 will be in the open position. The fill valve 134 and the exhaust valve 136 will be closed. If the train suddenly loses brake pipe pressure, such as brake pipe pressure falling to or below approximately 5 psi as a result of a pneumatic emergency application, the charging valve 72 of the Adapter assembly 28 will isolate the combined reservoir passageway 90 from the brake pipe passageway 88 of the housing 70 thereby keeping the auxiliary reservoir 5 and accelerated release reservoir 6 at a higher pressure than the brake pipe 2. As brake pipe pressure acting on the second side 116 of the diaphragm 106 of the adapter valve 74 falls below approximately 5 psi, the spring 108 of the adapter valve 74 will move the adapter valve 74 (valve body 104) to the first position thereby placing the combined reservoir passageway 90 in fluid communication with the brake cylinder passageway 86 of the housing 70 of the Adapter assembly 28 while isolating the brake cylinder passageway 86 from the brake cylinder exhaust passageway 96. As noted above, the brake cylinder passageway 86 of the housing 70 may in fluid communication with the brake cylinder dummy volume 7. When the pressure within the brake cylinder dummy volume 7 increases, the E/L relay valve 8 will move and allow the supply reservoir 4 to supply air pressure to the downstream brake cylinder 10, which will then provide a pneumatic full service braking function. Accordingly, the adapter valve 74 of the ECP adapter assembly 28 allows for a pneumatic brake application, which is a safety feature to ensure a full service brake application will occur if brake pipe pressure in the system 1 becomes too low.

Figure 10:
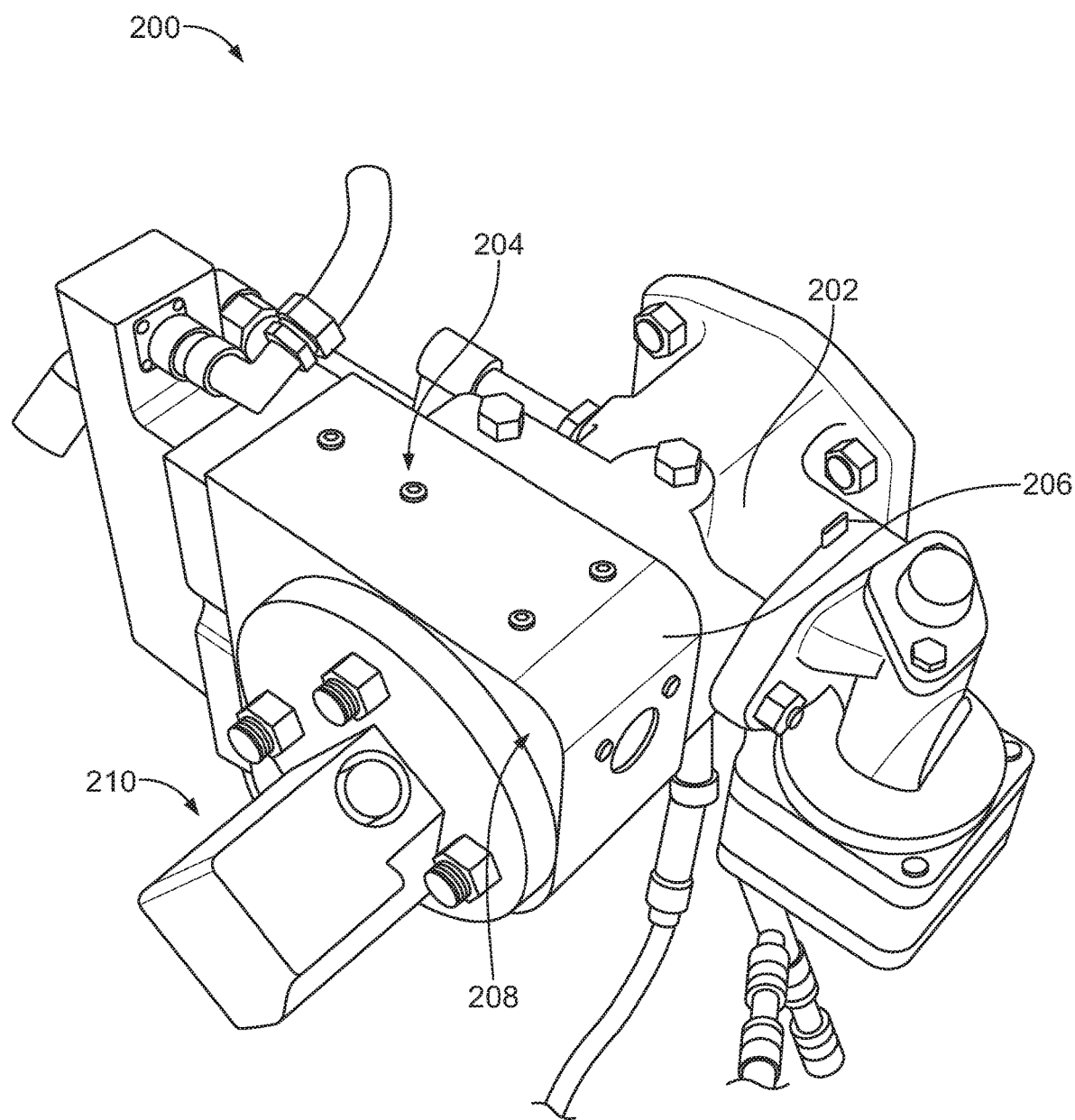
FIG. 10 is a perspective view of a braking system according to one embodiment.

FIG. 10 is a perspective view of a braking system 200 in accordance with one embodiment. The braking system includes a pipe bracket 202, an ECP manifold system 204 having a manifold body 206. The manifold body includes a face 208 configured to engage an adapter assembly 210.

Figure 11:
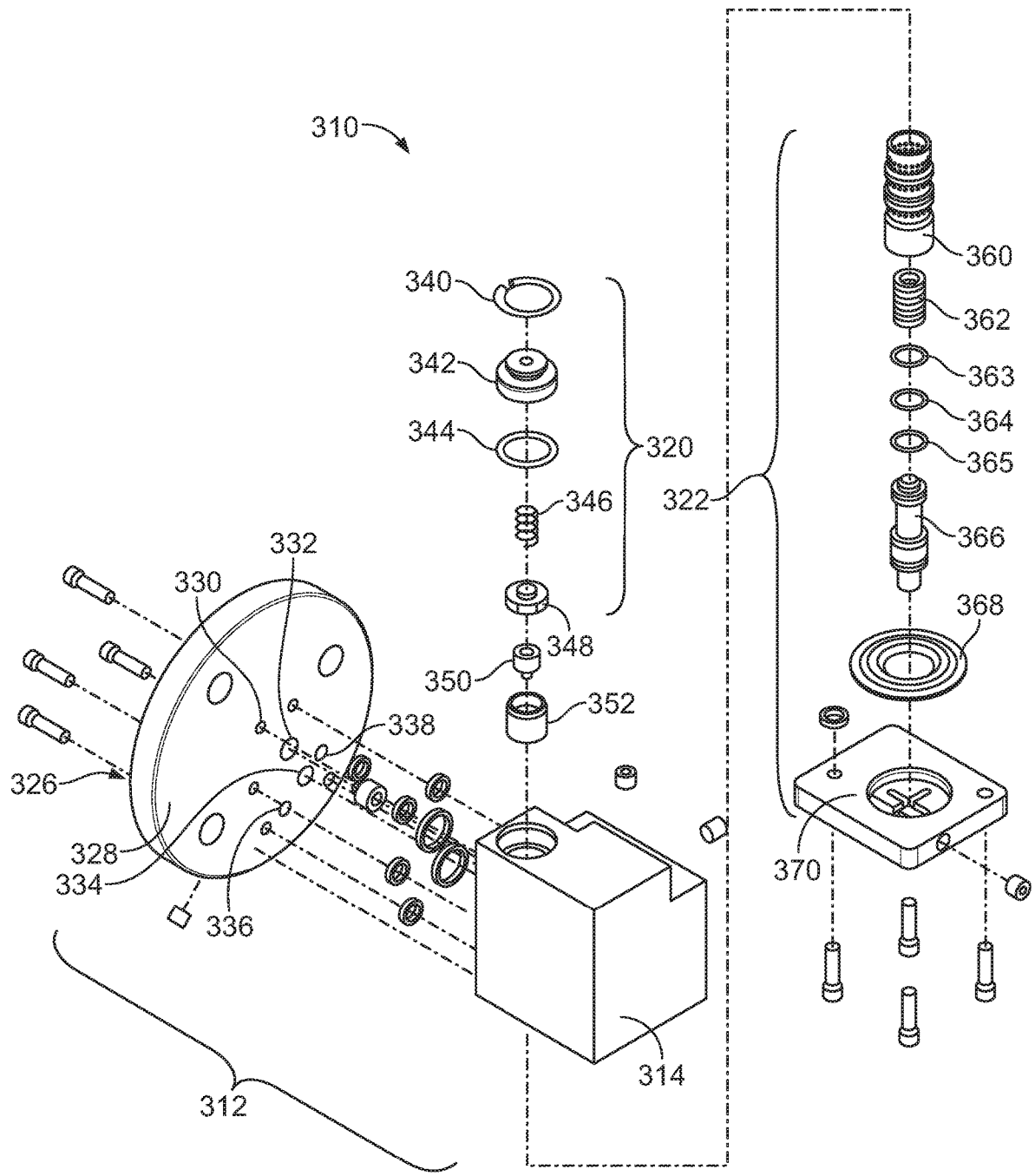
FIG. 11 is an exploded view of an adapter assembly according to one embodiment.

FIG. 11 illustrates an exploded view of an adapter assembly 310 formed in accordance with one embodiment. The adapter assembly may be similar or identical to the other adapter assemblies that are coupled to an ECP manifold system. The adapter assembly includes a housing 312 that includes a main body 314 and a housing plate 316. The adapter assembly also includes a charging valve 320 and an adapter valve 322. The housing has a mounting face 326 and an opposite body face 328 that defines an auxiliary reservoir port 330, a combined reservoir port 332, a brake cylinder port 334, a brake pipe port 336, and a brake cylinder exhaust port 338.

Although not shown, the housing includes a brake cylinder passageway in fluid communication with the brake cylinder port, a brake pipe passageway in fluid communication with the brake pipe port, a combined reservoir passageway in fluid communication with the auxiliary reservoir port and the accelerated release reservoir port, and a brake cylinder exhaust passageway in fluid communication with the brake cylinder exhaust port.

In some embodiments, the charging valve includes a retainer 340 (e.g., retaining ring), a valve cap 342, a o-ring 344, and a spring 346. The charging valve may also include a check valve 348. The check valve seals against the check valve seat 352, which therein include a choke 350.

The adapter valve includes bushing 360, a spring 362, o-rings 363, 364, 365, and a valve body 366. The valve body may be a spool valve (e.g., spool B). The valve body is configured to engage a diaphragm 368 that is coupled to a valve plate 370. As described herein, the adapter valve is configured to move the valve body between at least a first position and a second position. The spring and the diaphragm bias the valve body in opposite directions. When spring forces exceed forces provided by the diaphragm, the valve body is pushed toward the diaphragm. When the forces provided by the diaphragm exceed the forces provided by the spring, the valve body moves away from the diaphragm.

Figure 13:
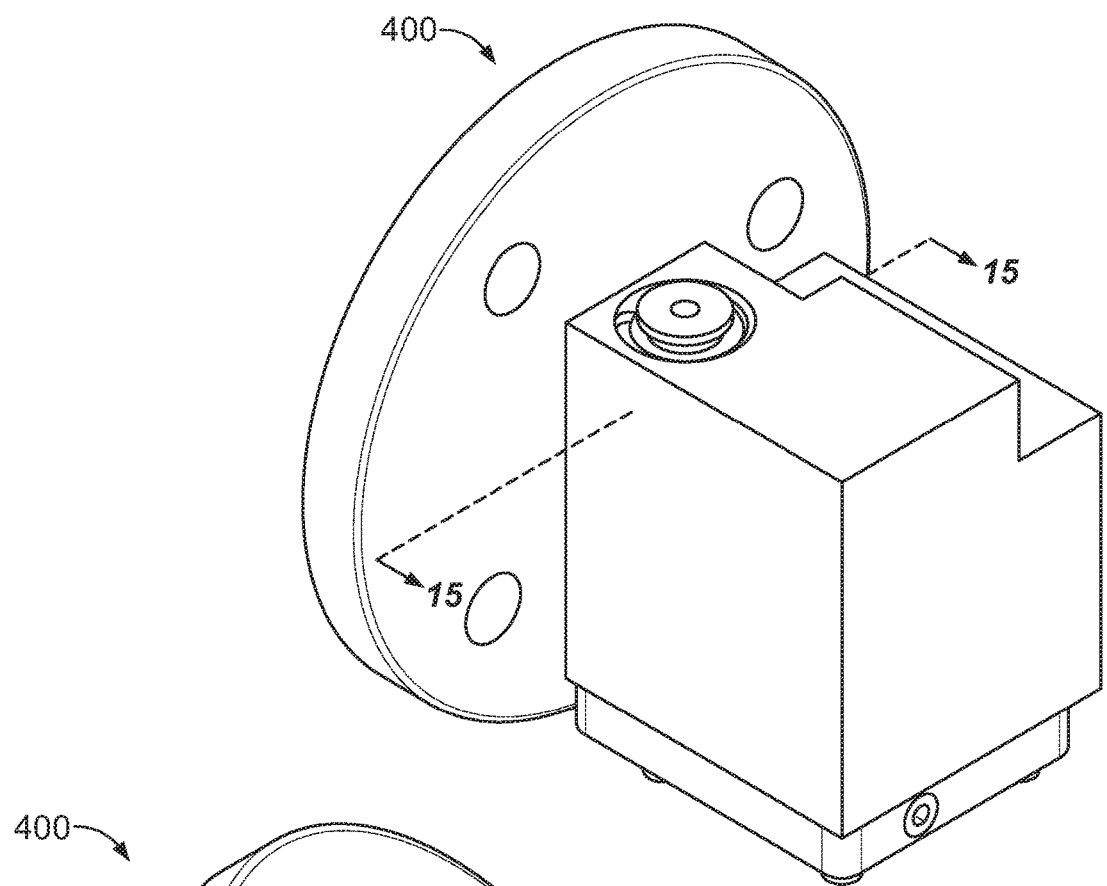
FIG. 13 is a front perspective view of the adapter assembly according to one embodiment.
Figure 12:
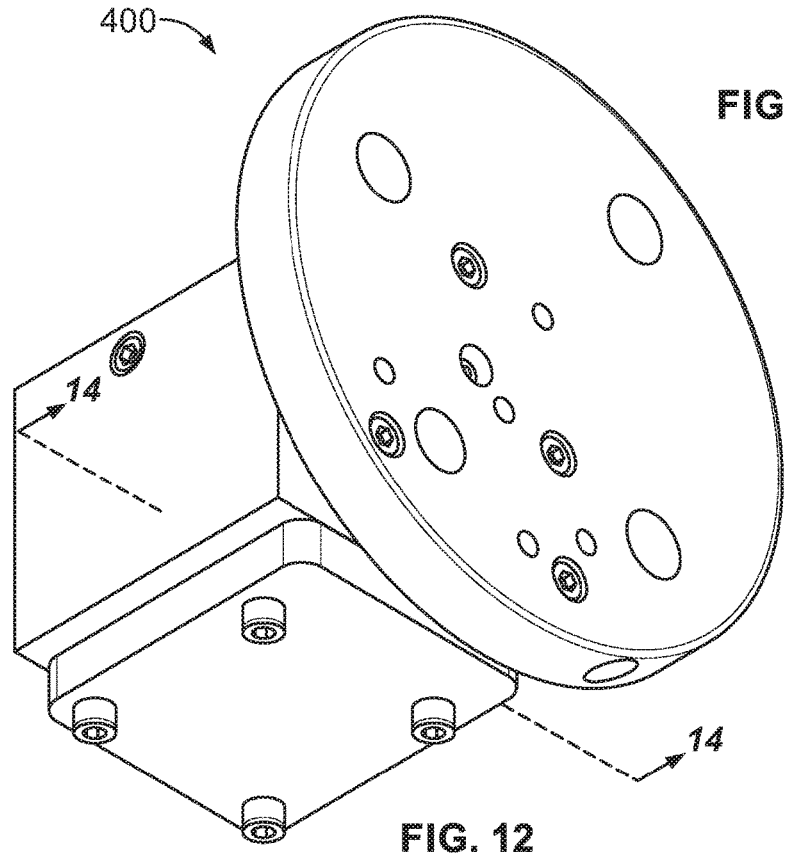
FIG. 12 is a rear perspective view of the adapter assembly according to one embodiment.
Figure 14:
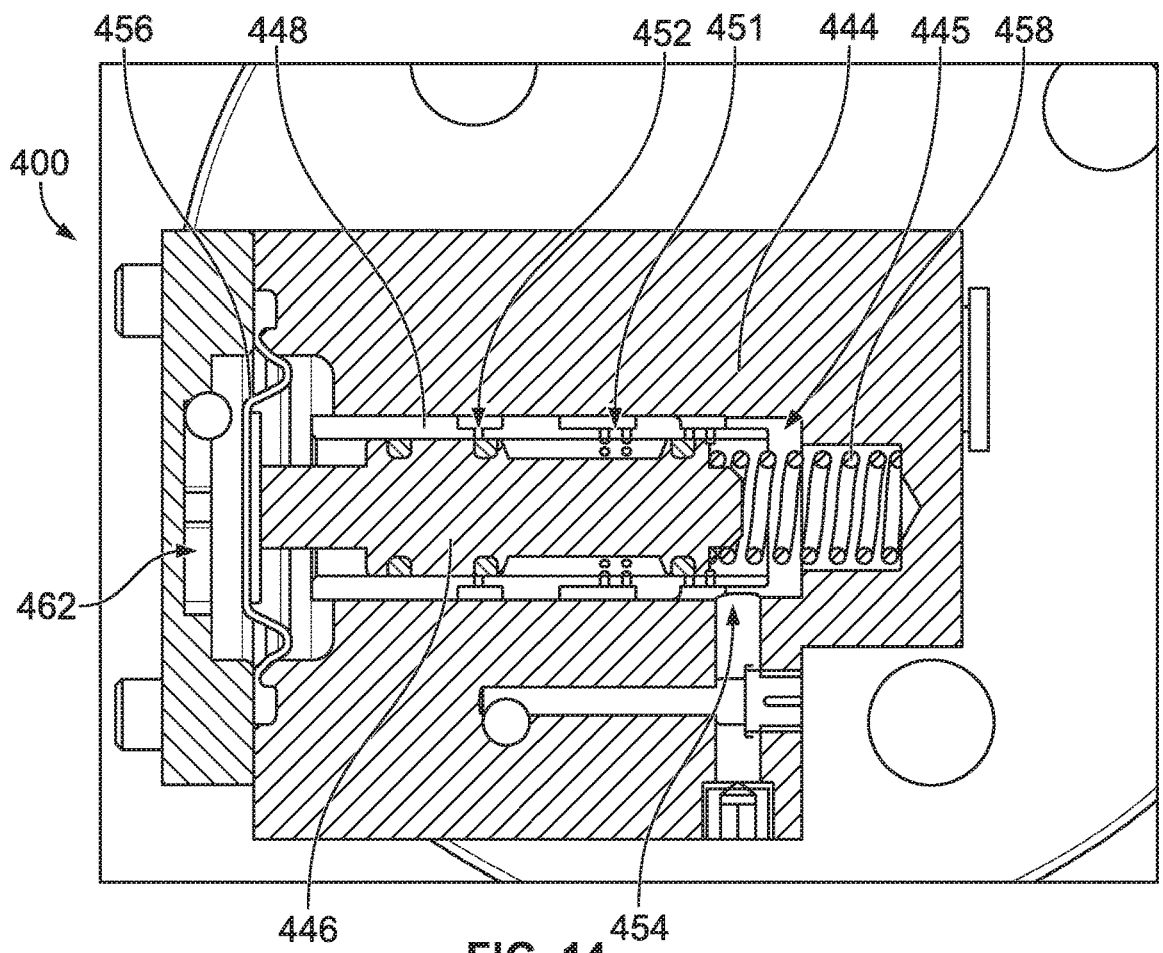
FIG. 14 illustrates a cross-section of the adapter assembly taken along the line 14-14 shown in FIG. 12.
Figure 15:
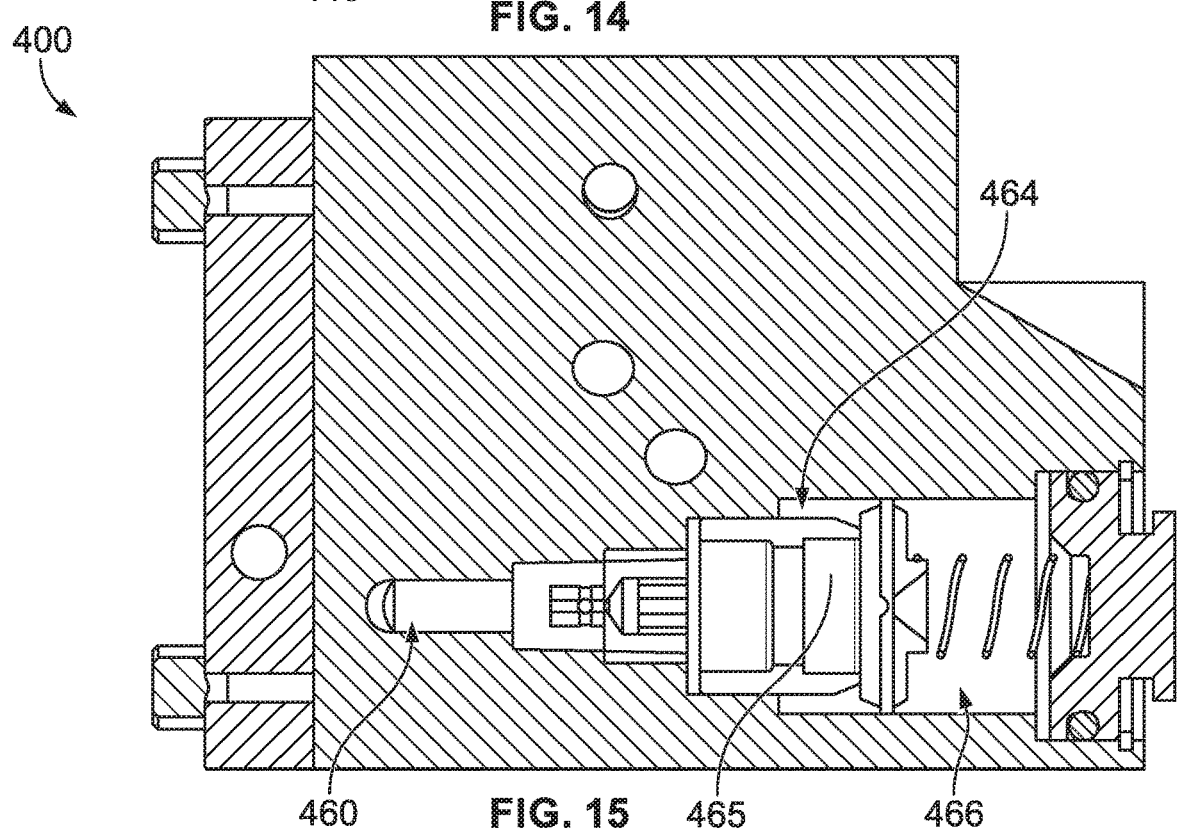
FIG. 15 illustrates a cross-section of the adapter assembly taken along the line 15-15 shown in FIG. 13.

FIGS. 12 and 13 illustrated different isolated perspective views of an adapter assembly 400, which may be similar or identical to the adapter assemblies described herein. FIG. 14 illustrates a cross-sectional view taken along the line 14-14 in FIG. 12, and FIG. 15 illustrates a cross-sectional view taken along the line 15-15 in FIG. 13. As shown, the adapter assembly includes a housing (or main body) 444 having a valve cavity 445 that receives a bushing 448 and a valve body 446 within the bushing. The valve body is biased at both ends. For example, the valve body is biased at a first end by a diaphragm 456 and biased at an opposite second end by a spring 458.

The housing includes passageways (not shown) that are in fluid communication with the valve cavity. The bushing and the valve body are sized and shaped relative to one another to form a brake cylinder bushing port 451, a combined reservoir bushing port 452, and a brake cylinder exhaust port 454. A brake pipe passageway 460 is in fluid communication with a biasing cavity 462 that exists on one side of the diaphragm. As described herein, air pressure within the biasing cavity is configured to increase and decrease thereby causing the valve body to move and the different ports open and close. Also shown, a charging valve 465 is disposed within a charging cavity 464 that is in fluid communication with an auxiliary reservoir port 466. The charging valve is positioned between the auxiliary reservoir port and the brake pipe passageway.

In accordance with an embodiment, a method is provided that includes providing a relayed brake system having an ECP overlay manifold system that includes a manifold body and a triple valve mounted to the manifold body. The method also includes removing a triple valve coupled to a manifold body of the ECP overlay manifold system and coupling an adapter assembly to the manifold body, wherein the adapter assembly enables pneumatic or electronic control of the relayed brake system. For example, the adapter assembly may permit the relayed brake system to emulate AEM function.

In one embodiment, an adapter assembly for an electronically controlled pneumatic (ECP) manifold system is provided. The adapter assembly includes a housing having a mounting face that includes a plurality of ports. The housing also has a brake cylinder passageway, a reservoir passageway, and a brake cylinder exhaust passageway that are in fluid communication with the ports. The adapter assembly also includes an adapter valve configured to be in fluid communication with the brake cylinder passageway, the reservoir passageway, and the brake cylinder exhaust passageway. The adapter valve has a first position where the brake cylinder passageway and the reservoir passageway are in fluid communication while the brake cylinder passageway is isolated from the brake cylinder exhaust passageway. The adapter valve also has a second position where the brake cylinder passageway is isolated from the reservoir passageway while the brake cylinder passageway is in fluid communication with the brake cylinder exhaust passageway.

Optionally, the adapter assembly also includes a charging valve that is in fluid communication with a brake pipe passageway and the reservoir passageway. The charging valve is configured to prevent a backflow of air from the reservoir passageway to the brake pipe passageway.

Optionally, the charging valve includes a check valve.

Optionally, the adapter assembly also includes a charging choke in fluid communication with the brake pipe passageway and positioned between the charging valve and a brake pipe port along the mounting face.

Optionally, the adapter valve comprises a bushing and a valve body. The valve body is moveable relative to the bushing between a first position corresponding to the first position of the adapter valve and a second position corresponding to the second position of the adapter valve.

Optionally, the adapter valve includes a spring. The spring biases the valve body in the first position or the second position.

Optionally, the adapter assembly also includes a diaphragm. The diaphragm has a first side and a second side positioned opposite the first side, wherein air pressure is configured to move the diaphragm to bias the valve body from the first position to the second position.

Optionally, the adapter assembly also includes a gasket positioned on the overlay mounting face of the housing.

In one embodiment, an assembly is provided that includes a manifold assembly having an electric manifold assembly. The electric manifold assembly includes a mode where the electric manifold assembly is controlled electrically. The assembly also includes an adapter assembly that has a housing having a mounting face coupled to the manifold assembly. The mounting face includes a plurality of ports. The housing includes a brake cylinder passageway, a reservoir passageway, and a brake cylinder exhaust passageway that are in fluid communication with the ports. The adapter assembly also includes an adapter valve configured to be in fluid communication with the brake cylinder passageway, the reservoir passageway, and the brake cylinder exhaust passageway. The adapter valve has a first position where the brake cylinder passageway and the reservoir passageway are in fluid communication while the brake cylinder passageway is isolated from the brake cylinder exhaust passageway. The adapter valve also has a second position where the brake cylinder passageway is isolated from the reservoir passageway while the brake cylinder passageway is in fluid communication with the brake cylinder exhaust passageway.

Optionally, the adapter assembly is pneumatically controlled.

Optionally, the adapter valve moves from the second position to the first position in response to a brake pipe pressure dropping below a designated baseline.

Optionally, the adapter assembly also includes a diaphragm configured to press against an end of the adapter valve. Responsive to the brake pipe pressure dropping, the diaphragm allows the valve body to move from the second position to the first position.

Optionally, the ports on the mounting face of the adapter assembly are configured to replace ports of a W-type triple valve.

In one embodiment, an ECP overlay and adapter assembly for a W-type triple valve system is provided. The assembly includes an ECP overlay manifold assembly that includes a manifold body comprising a pipe bracket face configured to engage a face of a pipe bracket of a railway brake system. The assembly also includes valve face configured to engage a face of a W-type triple valve of a railway brake system. The assembly also includes an electric manifold face. The ECP overlay and adapter assembly also includes an electric manifold assembly engaged with the electric manifold face of the manifold body. The electric manifold assembly having an ECP mode where the electric manifold assembly is configured to allow electronic control of a brake cylinder of a railway brake system. The ECP overlay and adapter assembly also includes an ECP adapter assembly that includes a housing having a mounting face engaged with the valve face of the manifold body. The mounting face defines an auxiliary reservoir port, an accelerated release reservoir port, a brake cylinder port, a brake pipe port, and a brake cylinder exhaust port. The housing defines a brake cylinder passageway in fluid communication with the brake cylinder port, a brake pipe passageway in fluid communication with the brake pipe port, a combined reservoir passageway in fluid communication with the auxiliary reservoir port and the accelerated release reservoir port, and a brake cylinder exhaust passageway in fluid communication with the brake cylinder exhaust port. The ECP overlay and adapter assembly also includes a charging valve in fluid communication with the brake pipe passageway and the combined reservoir passageway. The charging valve is configured to prevent a backflow of air from the combined reservoir passageway to the brake pipe passageway. The ECP overlay and adapter assembly also includes an adapter valve in fluid communication with the brake pipe passageway, the brake cylinder passageway, the combined reservoir passageway, and the brake cylinder exhaust passageway. The adapter valve has a first position where the brake cylinder passageway and the combined reservoir passageway are in fluid communication while the brake cylinder passageway is isolated from the brake cylinder exhaust passageway. The adapter valve has a second position where the brake cylinder passageway is isolated from the combined reservoir passageway while the brake cylinder passageway is in fluid communication with the brake cylinder exhaust passageway.

Optionally, the manifold body also includes a plurality of ports defined by the pipe bracket face, a plurality of ports defined by the valve face, and a plurality of ports defined by the electric manifold face. The plurality of ports of the pipe bracket face are in fluid communication with the plurality of ports of the valve face via a plurality of passages extending through the manifold body. The plurality of ports of the electric manifold face are in fluid communication with the plurality of passages.

Optionally, the plurality of ports of the pipe bracket face and the plurality of ports of the valve face each comprise an auxiliary reservoir pressure port, an accelerated release reservoir pressure port, a brake pipe pressure port, a brake cylinder pressure port, and a brake cylinder exhaust port. The auxiliary reservoir pressure ports of the pipe bracket face and the valve face are in fluid communication via an auxiliary reservoir pressure passage. The accelerated release reservoir pressure ports of the pipe bracket face and the valve face are in fluid communication via an accelerated release reservoir pressure passage. The brake pipe pressure ports of the pipe bracket face and the valve face are in fluid communication via a brake pipe pressure passage. The brake cylinder pressure ports of the pipe bracket face and the valve face are in fluid communication via a brake cylinder pressure passage. The brake cylinder exhaust ports of the pipe bracket face and the valve face are in fluid communication via a brake cylinder exhaust passage.

Optionally, the ECP overlay and adapter assembly includes a gasket engaged by the overlay mounting face of the housing and the valve face of the manifold body. The housing of the ECP adapter assembly and the gasket isolates the auxiliary reservoir pressure port of the valve face, the accelerated release reservoir pressure port of the valve face, the brake pipe pressure port of the valve face, the brake cylinder pressure port of the valve face, and the brake cylinder exhaust port of the valve face from each other.

Optionally, the auxiliary reservoir pressure port of the valve face of the manifold body is in fluid communication with the auxiliary reservoir port of the housing of the ECP adapter assembly. The accelerated release reservoir pressure port of the valve face of the manifold body is in fluid communication with the accelerated release reservoir port of the housing of the ECP adapter assembly. The brake pipe pressure port of the valve face of the manifold body is in fluid communication with the brake pipe port of the housing of the ECP adapter assembly. The brake cylinder pressure port of the valve face of the manifold body is in fluid communication with the brake cylinder port of the housing of the ECP adapter assembly, and the brake cylinder exhaust pressure port of the valve face of the manifold body is in fluid communication with the brake cylinder exhaust port of the housing of the ECP adapter assembly.

Optionally, the electric manifold assembly includes an isolation valve, a fill valve, and a brake cylinder exhaust valve. The isolation valve, the fill valve, and the brake cylinder exhaust valve each having an open position and closed position. When the electric manifold assembly is in the ECP mode with the fill valve in the open position, and the isolation valve and the brake cylinder exhaust valve are each in the closed position, the fill valve is configured to place an auxiliary reservoir passage in fluid communication with a brake cylinder pressure passage.

Optionally, the isolation valve, the fill valve, and the brake cylinder exhaust valve are electronically-controlled via an isolation solenoid, a fill solenoid, and a brake cylinder exhaust solenoid, respectively.

In one embodiment, an ECP adapter assembly for an ECP overlay system for a W-type triple valve includes a housing having a mounting face that defines an auxiliary reservoir port, an accelerated release reservoir port, a brake cylinder port, a brake pipe port, and a brake cylinder exhaust port, with the housing defining a brake cylinder passageway in fluid communication with the brake cylinder port, a brake pipe passageway in fluid communication with the brake pipe port, a combined reservoir passageway in fluid communication with the auxiliary reservoir port and the accelerated release reservoir port, and a brake cylinder exhaust passageway in fluid communication with the brake cylinder exhaust port. The assembly also includes a charging valve in fluid communication with the brake pipe passageway and the combined reservoir passageway, with the charging valve configured to prevent a backflow of air from the combined reservoir passageway to the brake pipe passageway, and an adapter valve in fluid communication with the brake pipe passageway, the brake cylinder passageway, the combined reservoir passageway, and the brake cylinder exhaust passageway. The adapter valve has a first position where the brake cylinder passageway and the combined reservoir passageway are in fluid communication while the brake cylinder passageway is isolated from the brake cylinder exhaust passageway and a second position where the brake cylinder passageway is isolated from the combined reservoir passageway and the brake cylinder passageway is in fluid communication with the brake cylinder exhaust passageway.

The charging valve may be a check valve. The assembly may further include a charging choke in fluid communication with the brake pipe passageway and positioned between the brake pipe port and the charging valve. The adapter valve may include a bushing, a valve body, a diaphragm, and a spring, with the valve body moveable relative to the bushing between a first position corresponding to the first position of the adapter valve and a second position corresponding to the second position of the adapter valve, and with the spring biasing the valve body from the second position toward the first position. The bushing may define a combined reservoir bushing port in fluid communication with the combined reservoir passageway, a brake cylinder bushing port in fluid communication with the brake cylinder passageway, and a brake cylinder exhaust bushing port in fluid communication with the brake cylinder exhaust passageway, with the diaphragm having a first side and a second side positioned opposite the first side, the second side of the diaphragm in fluid communication with the brake pipe passageway, and with the air pressure from the brake pipe passageway configured to bias the valve body from the first position to the second position. The valve body includes a first O-ring, a second O-ring, and a third O-ring, with the first O-ring and the second O-ring isolating the brake cylinder bushing port and the brake cylinder exhaust bushing port from the combined reservoir bushing port when the valve body is in the second position, the second O-ring and the third O-ring isolating the combined reservoir bushing port from the brake cylinder bushing port and the brake cylinder exhaust bushing port when the valve body is in the second position, and where a distance between the first O-ring and second O-ring is configured to allow fluid communication between the combined reservoir bushing port and the brake cylinder bushing port when the valve body is in the first position. The first O-ring may also isolate the brake cylinder bushing port from the brake cylinder exhaust bushing port when the valve body is in the first position.

The assembly may further include a gasket positioned on the overlay mounting face of the housing.

In one embodiment, an ECP overlay and adapter assembly for a W-type triple valve system includes an ECP overlay assembly including a manifold body having a pipe bracket face configured to engage a face of a pipe bracket of a railway brake system, a valve face configured to engage a face of a W-type triple valve of a railway brake system, and an electric manifold face, and an electric manifold assembly engaged with the electric manifold face of the manifold body. The electric manifold assembly has an ECP mode where the electric manifold assembly is configured to allow electronic control of a brake cylinder of a railway brake system. The ECP overlay and adapter assembly further includes a housing having a mounting face engaged with the valve face of the manifold body, with the mounting face defining an auxiliary reservoir port, an accelerated release reservoir port, a brake cylinder port, a brake pipe port, and a brake cylinder exhaust port. The housing defines a brake cylinder passageway in fluid communication with the brake cylinder port, a brake pipe passageway in fluid communication with the brake pipe port, a combined reservoir passageway in fluid communication with the auxiliary reservoir port and the accelerated release reservoir port, and a brake cylinder exhaust passageway in fluid communication with the brake cylinder exhaust port. The ECP adapter assembly further includes a charging valve in fluid communication with the brake pipe passageway and the combined reservoir passageway, with the charging valve configured to prevent a backflow of air from the combined reservoir passageway to the brake pipe passageway, and an adapter valve in fluid communication with the brake pipe passageway, the brake cylinder passageway, and the combined reservoir passageway. The adapter valve has a first position where the brake cylinder passageway and the combined reservoir passageway are in fluid communication while the brake cylinder passageway is isolated from the brake cylinder exhaust passageway and a second position where the brake cylinder passageway is isolated from the combined reservoir passageway while the brake cylinder passageway is in fluid communication with the brake cylinder exhaust passageway.

The manifold body may further include a plurality of ports defined by the pipe bracket face, a plurality of ports defined by the valve face, and a plurality of ports defined by the electric manifold face, with the plurality of ports of the pipe bracket face in fluid communication with the plurality of ports of the valve face via a plurality of passages extending through the manifold body. The plurality of ports of the electric manifold face may be in fluid communication with the plurality of passages. The plurality of ports of the pipe bracket face and the plurality of ports of the valve face may each include an auxiliary reservoir pressure port, an accelerated release reservoir pressure port, a brake pipe pressure port, a brake cylinder pressure port, and a brake cylinder pressure exhaust port, with the auxiliary reservoir pressure ports of the pipe bracket face and the valve face in fluid communication via an auxiliary reservoir pressure passage, with the accelerated release reservoir pressure ports of the pipe bracket face and the valve face in fluid communication via an accelerated release reservoir pressure passage, with the brake pipe pressure ports of the pipe bracket face and the valve face in fluid communication via a brake pipe pressure passage, with the brake cylinder pressure ports of the pipe bracket face and the valve face in fluid communication via a brake cylinder pressure passage, and with the brake cylinder exhaust ports of the pipe bracket face and the valve face in fluid communication via a brake cylinder exhaust passage.

The assembly may further include a gasket engaged by the overlay mounting face of the housing and the valve face of the manifold body. The auxiliary reservoir pressure port of the valve face of the manifold body may be in fluid communication with the auxiliary reservoir port of the housing of the ECP adapter assembly, the accelerated release reservoir pressure port of the valve face of the manifold body may be in fluid communication with the accelerated release reservoir port of the housing of the ECP adapter assembly, the brake pipe pressure port of the valve face of the manifold body may be in fluid communication with the brake pipe port of the housing of the ECP adapter assembly, the brake cylinder pressure port of the valve face of the manifold body may be in fluid communication with the brake cylinder port of the housing of the ECP adapter assembly, and the brake cylinder exhaust port of the valve face of the manifold body may be in fluid communication with the brake cylinder exhaust port of the housing of the ECP adapter assembly. The electric manifold assembly may include an isolation valve, a fill valve, and a brake cylinder exhaust valve, with the isolation valve, the fill valve, and the brake cylinder exhaust valve each having an open position and closed position, and where, when the electric manifold assembly is in the ECP mode with the fill valve in the open position and the isolation valve and the brake cylinder exhaust valve in the closed position, with the fill valve configured to place an auxiliary reservoir passage in fluid communication with a brake cylinder pressure passage. The isolation valve, the fill valve, and the brake cylinder exhaust valve may be electronically-controlled via an isolation solenoid, a fill solenoid, and a brake cylinder exhaust solenoid, respectively.

The assembly may further include a charging choke in fluid communication with the brake pipe passageway and positioned between the brake pipe port and the charging valve. The assembly may further include a combined reservoir choke in the combined reservoir passageway leading to the adapter valve. The adapter valve may include a bushing, a valve body, a diaphragm, and a spring, with the valve body moveable relative to the bushing between a first position corresponding to the first position of the adapter valve and a second position corresponding to the second position of the adapter valve, where the spring biases the valve body from the second position toward the first position. The bushing may define a combined reservoir bushing port in fluid communication with the combined reservoir passageway, a brake cylinder bushing port in fluid communication with the brake cylinder passageway, and a brake cylinder exhaust bushing port in fluid communication with the brake cylinder exhaust passageway, with the diaphragm having a first side and a second side positioned opposite the first side, and with the second side of the diaphragm in fluid communication with the brake pipe passageway, where air pressure from the brake pipe passageway is configured to bias the valve body from the first position to the second position. The valve body may include a first O-ring, a second O-ring, and a third O-ring, with the first O-ring and the second O-ring isolating the brake cylinder bushing port and the brake cylinder exhaust bushing port from the combined reservoir bushing port when the valve body is in the second position, the second O-ring and the third O-ring isolating the combined reservoir bushing port from the brake cylinder bushing port and the brake cylinder exhaust bushing port when the valve body is in the second position, and where a distance between the first O-ring and second O-ring is configured to allow fluid communication between the combined reservoir bushing port and the brake cylinder bushing port when the valve body is in the first position. The first O-ring may isolate the brake cylinder bushing port from the brake cylinder exhaust bushing port when the valve body is in the first position. The charging valve may be a check valve.

While embodiments of an ECP adapter assembly for an ECP overlay system were provided in the foregoing description, those skilled in the art may make modifications and alterations to these embodiments without departing from the scope and spirit of the inventive subject matter. Accordingly, the foregoing description is intended to be illustrative rather than restrictive. The inventive subject matter described hereinabove is defined by the appended claims and all changes to the inventive subject matter that fall within the meaning and the range of equivalency of the claims are to be embraced within their scope.

As described herein, embodiments may be implemented by one or more processors that are configured to execute one or more sets of instructions stored in memory (e.g., one or more computer-readable mediums). The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine. The program may be compiled to run on, for example, a 32-bit, 64-bit, or 132-bit operating systems.

As used herein, the terms "software" and "firmware" are interchangeable and include a computer program stored in memory for execution by a processor or other logic-based device. The computer program may be in the form of a computer program code containing instructions embodied in a computer-readable medium (e.g., a tangible and non-transitory computer readable storage medium), such as RAM memory, ROM memory, EPROM memory, EEPROM memory, and non-volatile RAM (NVRAM) memory. Computer-readable medium may also include floppy diskettes, CD-ROM's, hard drives, DVD's, solid state drive, removable media, and the like. The above memory types are exemplary only and are thus not limiting as to the types of memory usable for storage of a computer program.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments and are by no means limiting and are merely exemplary embodiments. Many other embodiments and modifications within the scope of the claims will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 212, sixth paragraph, unless and until such claim limitations expressly use the phrase "means for" followed by a statement of function void of further structure.

This written description uses examples to disclose the invention, including the best mode, and also to enable a person of ordinary skill in the art to practice the invention, including making and using devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An adapter assembly for an electronically controlled pneumatic (ECP) manifold system, the adapter assembly comprising:
    a housing having a mounting face that includes a plurality of ports, the housing also having a brake cylinder passageway, a reservoir passageway, and a brake cylinder exhaust passageway that are in fluid communication with the ports; and
    an adapter valve contained within the housing, and configured to be in fluid communication with the brake cylinder passageway, the reservoir passageway, and the brake cylinder exhaust passageway, the adapter valve having a first position, wherein the brake cylinder passageway and the reservoir passageway are in fluid communication while the brake cylinder passageway is isolated from the brake cylinder exhaust passageway, and a second position, wherein the brake cylinder passageway is isolated from the reservoir passageway while the brake cylinder passageway is in fluid communication with the brake cylinder exhaust passageway.

2. The adapter assembly of claim 1, further comprising a charging valve in fluid communication with a brake pipe passageway and the reservoir passageway, the charging valve configured to prevent a backflow of air from the reservoir passageway to the brake pipe passageway.

3. The adapter assembly of claim 2, wherein the charging valve comprises a check valve.

4. The adapter assembly of claim 2, further comprising a charging choke in fluid communication with the brake pipe passageway and positioned between the charging valve and a brake pipe port along the mounting face.

5. The adapter assembly of claim 1, wherein the adapter valve comprises a bushing and a valve body, the valve body being moveable relative to the bushing between a first position corresponding to the first position of the adapter valve and a second position corresponding to the second position of the adapter valve.

6. The adapter assembly of claim 5, wherein the adapter valve includes a spring, the spring biasing the valve body in the first position or the second position.

7. The adapter assembly of claim 5, further comprising a diaphragm, the diaphragm having a first side and a second side positioned opposite the first side, wherein air pressure is configured to move the diaphragm to bias the valve body from the first position to the second position.

8. The adapter assembly of claim 1, further comprising a gasket positioned on the mounting face of the housing.

9. An assembly comprising:
a manifold assembly comprising:
an electric manifold assembly having a mode where the electric manifold assembly is controlled electrically; and
an adapter assembly comprising:
a housing having a mounting face coupled to the manifold assembly, the mounting face including a plurality of ports, the housing including a brake cylinder passageway, a reservoir passageway, and a brake cylinder exhaust passageway that are in fluid communication with the ports; and
an adapter valve contained within the housing, and configured to be in fluid communication with the brake cylinder passageway, the reservoir passageway, and the brake cylinder exhaust passageway, the adapter valve having a first position where the brake cylinder passageway and the reservoir passageway are in fluid communication while the brake cylinder passageway is isolated from the brake cylinder exhaust passageway and a second position where the brake cylinder passageway is isolated from the reservoir passageway while the brake cylinder passageway is in fluid communication with the brake cylinder exhaust passageway.

10. The assembly of claim 9, wherein the adapter assembly is pneumatically controlled.

11. The assembly of claim 9, wherein the adapter valve moves from the second position to the first position in response to a brake pipe pressure dropping below a designated baseline.

12. The assembly of claim 11, further comprising a diaphragm configured to press against an end of the adapter valve, wherein, responsive to the brake pipe pressure dropping, the diaphragm allows the valve body to move from the second position to the first position.

13. The assembly of claim 9, wherein the ports on the mounting face of the adapter assembly are configured to replace ports of a W-type triple valve.

14. An ECP overlay and adapter assembly for a W-type triple valve system, the assembly comprising:
an ECP overlay manifold assembly comprising:
a manifold body comprising a pipe bracket face configured to engage a face of a pipe bracket of a railway brake system, a valve face configured to engage a face of a W-type triple valve of a railway brake system, and an electric manifold face; and
an electric manifold assembly engaged with the electric manifold face of the manifold body, the electric manifold assembly having an ECP mode where the electric manifold assembly is configured to allow electronic control of a brake cylinder of a railway brake system; and
an ECP adapter assembly comprising:
a housing having a mounting face engaged with the valve face of the manifold body, the mounting face defines an auxiliary reservoir port, an accelerated release reservoir port, a brake cylinder port, a brake pipe port, and a brake cylinder exhaust port, the housing defining a brake cylinder passageway in fluid communication with the brake cylinder port, a brake pipe passageway in fluid communication with the brake pipe port, a combined reservoir passageway in fluid communication with the auxiliary reservoir port and the accelerated release reservoir port, and a brake cylinder exhaust passageway in fluid communication with the brake cylinder exhaust port;
a charging valve in fluid communication with the brake pipe passageway and the combined reservoir passageway, the charging valve configured to prevent a backflow of air from the combined reservoir passageway to the brake pipe passageway; and
an adapter valve contained within the housing, and in fluid communication with the brake pipe passageway, the brake cylinder passageway, the combined reservoir passageway, and the brake cylinder exhaust passageway, the adapter valve having a first position where the brake cylinder passageway and the combined reservoir passageway are in fluid communication while the brake cylinder passageway is isolated from the brake cylinder exhaust passageway, and a second position where the brake cylinder passageway is isolated from the combined reservoir passageway while the brake cylinder passageway is in fluid communication with the brake cylinder exhaust passageway.

15. The assembly of claim 14, wherein the manifold body further comprises a plurality of ports defined by the pipe bracket face, a plurality of ports defined by the valve face, and a plurality of ports defined by the electric manifold face, the plurality of ports of the pipe bracket face are in fluid communication with the plurality of ports of the valve face via a plurality of passages extending through the manifold body, the plurality of ports of the electric manifold face are in fluid communication with the plurality of passages.

16. The assembly of claim 15, wherein the plurality of ports of the pipe bracket face and the plurality of ports of the valve face each comprise an auxiliary reservoir pressure port, an accelerated release reservoir pressure port, a brake pipe pressure port, a brake cylinder pressure port, and a brake cylinder exhaust port, the auxiliary reservoir pressure ports of the pipe bracket face and the valve face are in fluid communication via an auxiliary reservoir pressure passage, the accelerated release reservoir pressure ports of the pipe bracket face and the valve face are in fluid communication via an accelerated release reservoir pressure passage, the brake pipe pressure ports of the pipe bracket face and the valve face are in fluid communication via a brake pipe pressure passage, the brake cylinder pressure ports of the pipe bracket face and the valve face are in fluid communication via a brake cylinder pressure passage, the brake cylinder exhaust ports of the pipe bracket face and the valve face are in fluid communication via a brake cylinder exhaust passage.

17. The assembly of claim 16, further comprising a gasket engaged by the mounting face of the housing and the valve face of the manifold body, the housing of the ECP adapter assembly and the gasket isolating the auxiliary reservoir pressure port of the valve face, the accelerated release reservoir pressure port of the valve face, the brake pipe pressure port of the valve face, the brake cylinder pressure port of the valve face, and the brake cylinder exhaust port of the valve face from each other.

18. The assembly of claim 16, wherein the auxiliary reservoir pressure port of the valve face of the manifold body is in fluid communication with the auxiliary reservoir port of the housing of the ECP adapter assembly, the accelerated release reservoir pressure port of the valve face of the manifold body is in fluid communication with the accelerated release reservoir port of the housing of the ECP adapter assembly, the brake pipe pressure port of the valve face of the manifold body is in fluid communication with the brake pipe port of the housing of the ECP adapter assembly, the brake cylinder pressure port of the valve face of the manifold body is in fluid communication with the brake cylinder port of the housing of the ECP adapter assembly, and the brake cylinder exhaust pressure port of the valve face of the manifold body is in fluid communication with the brake cylinder exhaust port of the housing of the ECP adapter assembly.

19. The assembly of claim 14, wherein the electric manifold assembly comprises an isolation valve, a fill valve, and a brake cylinder exhaust valve, the isolation valve, the fill valve and the brake cylinder exhaust valve each having an open position and closed position, and wherein, when the electric manifold assembly is in the ECP mode with the fill valve in the open position, and the isolation valve and the brake cylinder exhaust valve are each in the closed position, the fill valve is configured to place an auxiliary reservoir passage in fluid communication with a brake cylinder pressure passage.

20. The assembly of claim 19, wherein the isolation valve, the fill valve, and the brake cylinder exhaust valve are electronically-controlled via an isolation solenoid, a fill solenoid, and a brake cylinder exhaust solenoid, respectively.

\* \* \* \* \*